United States Patent [19]
Nakazato et al.

[11] Patent Number: 6,094,546
[45] Date of Patent: Jul. 25, 2000

[54] PRINTING SYSTEM

[75] Inventors: Hirohiko Nakazato; Yukihiro Saida, both of Tokyo, Japan

[73] Assignee: Oki Data Corporation, Tokyo, Japan

[21] Appl. No.: 09/432,056

[22] Filed: Nov. 1, 1999

[30] Foreign Application Priority Data

Nov. 18, 1998 [JP] Japan ................................. 10-327380

[51] Int. Cl.[7] .................................................. G03G 15/00
[52] U.S. Cl. .................................................. 399/1; 399/38
[58] Field of Search .................................. 399/1, 38, 44, 399/328–338, 411; 347/900

[56] References Cited

U.S. PATENT DOCUMENTS 5,274,461  12/1993  Mitsuhashi ............................. 358/296
5,489,935  2/1996  Dornier .................................. 347/211
5,930,551  7/1999  Nakazato et al. .......................... 399/1

*Primary Examiner*—Richard Moses
*Attorney, Agent, or Firm*—Rabin & Champagne, P.C.

[57] ABSTRACT

There is disclosed a printing system the printing data generation time calculating section of which calculates the time required for generating printing data on the side of the host computer. The printer warm-up time measuring section calculates warming-up time of the printer by referring to database. The warm-up command outputting section sends a warm-up command to the printer controlling section at such a time as the timing for terminating warming-up coincides with the timing for terminating the generation of printing data. Immediately after the completion of warming-up of the printer, since the printing data is transferred, power consumption in the dormant state is reduced.

8 Claims, 32 Drawing Sheets

FIG. 4

WaitTime=PcMetaTime-PrWarmUpTime (a)

| Graphics-drawing | Processing time (unit: ms) | Summary of commands |
|---|---|---|
| TEXT | 1.0ms/char | Text |
| LINE | 10.0ms/line | Line |
| CIRCLE | 20.0ms/circle | Circle |
| CURVE | 20.0ms/curve | Curve |
| PIXEL | 1.0ms/pixel | Pixel |
| IMAGE | 0.1ms/pixel | Bitmap |
| OTHER | 10ms/other | Others |

(b)

PcMetaTime=Count(Text)*Time(TEXT)+Count(LINE)*Time(LINE)+Count(CIRCLE)*Time(CIRCLE)+Count(CURVE)*Time(CURVE)+Count(PIXEL)*Time(PIXEL)+Σ(IMAGE*Time(IMAGE))+Count(OTHER)*Time(OTHER)

The number of texts drawn graphically = 2400 characters
The number of lines drawn graphically = 100 lines
The number of circles drawn graphically = 2 circles
The number of curves drawn graphically = 20 curves
The number of pixels drawn graphically = 4000 pixels
The number of image data drawn graphically = 10 images each having the size of 40K pixels
The number of functions of graphics-drawing = 200

(a)

PcMetaTime=2400*1+100*10+2*20+20*20+4000*1+10*40*1024*0.1+200*10

=2400+3000+40+400+4000+40960+2000

=52800[ms]

(b)

| Type of paper | Fixing temperature (unit: °C) | Warm-up time (unit: second) |
|---|---|---|
| Thick paper mode | 180 | 68.0 |
| Ordinary paper mode | 160 | 55.0 |
| Thin paper mode | 150 | 45.0 |
| Card mode | 170 | 60.0 |
| Envelope mode | 175 | 65.0 |
| OHP mode | 165 | 58.0 |
| Other | 160 | 55.0 |

| Printer state | Power consumption (W/h) | | Remarks |
| --- | --- | --- | --- |
| | Small-sized printer | Large-sized printer | |
| Power-saving state | 5 | 18 | Only logic function is operating |
| Idle state | 30 | 61 | Logic function and heater are operating |
| During printing operation | 100 | 215 | Logic function, heater and motor are operating |

FIG. 19

| Factor no. | ST_TEMP (°C) | Ready_Time (msec/count) |
|---|---|---|
| 0 | 35 | 30000 |
| 1 | 50 | 25000 |
| 2 | 70 | 20000 |

Factor no.

(a)

$PrWarmUpTime = (1-(CURRENT\_TEMP-ST\_TEMP[i])/ST\_TEM[i]) \times PReady\_TIME[i]$ (b)

$PrWarmUpTime = PReady\_TIME[i] + ((PReady\_TIME[i]-PReady\_TIME[i-1])/ST\_TEMP[i]-ST\_TEMP[i-1]) \times (PReady\_TIME[i]-CURRENT\_TEMP)$ (c)

$PrWarmUpTime = PReady\_TIME[0] + (PReady\_TIME[0]/ST\_TEMP[0]) \times (PReady\_TIME[0]-CURRENT\_TEMP)$ (d)

$PrWarmUpTime = PReady\_TIME[i]$ (e)

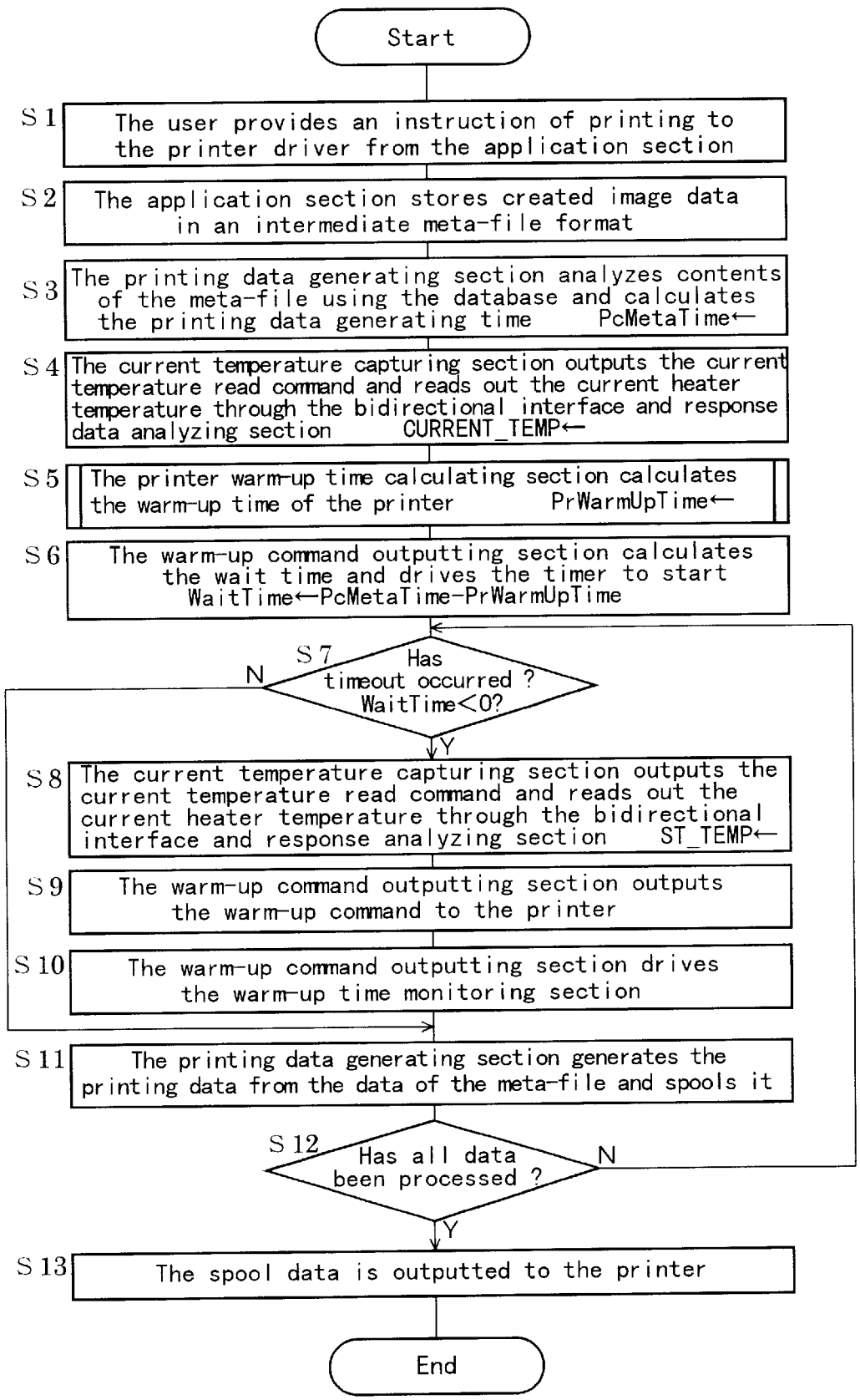

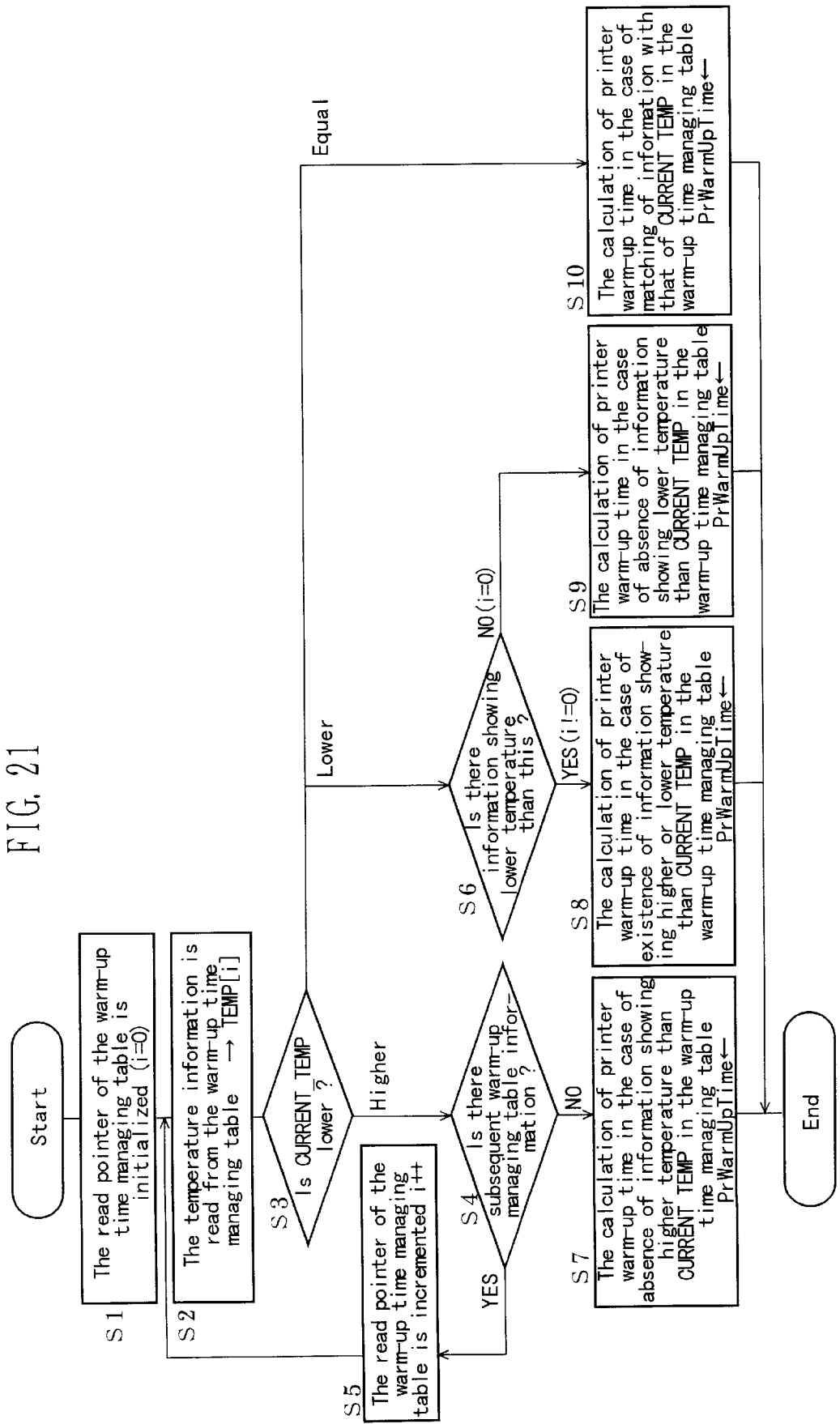

(a)

| ST_TEMP information | CHG_TIME | STS_INFO |
|---|---|---|
| 35 (°C) | 1000 (msec) | 1 |
| 40 (°C) | 960 (msec) | 1 |
| ⋮ | ⋮ | ⋮ |
| 145 (°C) | 800 (msec) | 1 |
| 150 (°C) | 0 (msec) | 0 |

(b)

PRINTING SYSTEM

BACKGROUND OF THE INVENTION

1. Field of the Invention

The present invention relates to a printing system and more particularly to a printing system which can reduce the power consumption during idle time by sending a command to release a idle state to a printer prior to a start of printing and, at the same time, an information equipment producing printing data (hereinafter referred to as a host computer) starts the generation of the printing data and then the host computer transfers created printing data to the printer.

2. Description of the Related Art

In general, printing data created by a personal computer, word processor and other various information devices is supplied to a printer. On the other hand, by release data sent from the host computer, the printer starts warming-up from a idle state. When warming-up is complete, the printer is in the state where the printing is done. If the printer remains in the state where printing is possible following warming-up immediately after the power is on, the power consumption in the dormant state becomes great. The technology of this kind is disclosed in Japanese Provisional Publication No. 9-62466. Hereinafter, the idle state is referred to as a state where the warming-up is not made after the printer is turned ON.

However, the above conventional technology presents a problem. That is, the power consumption is different between the idle state where a warming-up start command is waited by the host computer and the state where the warming-up is complete and printing is possible. It is desirous that the printer is controlled so as to receive printing data from the host computer immediately after the warming-up is complete and the printer moves to a idle state immediately after the printing is complete.

However, the timing at which printing data is transferred from the host computer to the printer is different according to computational processing capability of the host computer and the quality and contents of printing data.

The generation of printing data is terminated at a short time if a document has simple character. In the case of having complicated image data, it takes long time to generate printing data.

Warming-up time varies depending on the printer. Even if the warming-up of the printer is complete, in some cases, a state where printing data is transferred from the host computer for a long time. This causes a waste of power.

On the other hand, there is a case where printing data is generated by the host computer before the warming-up of the printer is terminated. At this point, since the host computer has to wait for the transfer of printing data, the effective use of the memory resource is interfered. That is, since the host computer has to hold printing data for processing of calculation before the transfer of the printing data is terminated, the memory cannot be used for other operational processing.

SUMMARY OF THE INVENTION

In view of the above, it is an object of the present invention to provide a printing system to perform printing after receiving printing data from a host computer, which is able to reduce the power consumption in the dormant state.

According to a first aspect of the present invention, a printing system comprising a host computer and a printer to perform printing by receiving printing data from the host computer;

the host computer having a printing data generating time calculating section for calculating the time required to generate the printing data, a printer warm-up time calculating section for calculating warm-up time of a printer and a warm-up command outputting section to send a warm-up command to the printer to start warming-up operation;

the warm-up command outputting section, by referring to calculating results of the printing data generating time calculating section and printer warm-up time calculating section, sends the warm-up command at the timing when the generation of the printing data is terminated at the same time or before the warming-up is terminated.

According to a second aspect of the present invention, there is provided a printing system comprising a host computer and a printer to perform printing after receiving printing data from the host computer, the host computer having a printing data generating time calculating section for calculating the time required for generating the printing data, a printer warm-up time calculating section for calculating warm-up time of the printer and a warm-up command outputting section to send a warm-up command to a printer to start warming-up;

the warm-up command outputting section, by referring to calculation results of the printing data generating time calculating section and a printer warm-up time calculating section, sends data showing idle time to make starting of the warming-up delayed to the printer, together with a warm-up command, so that the generation of the printing data is terminated at the same time or before the warming-up is terminated.

In the foregoing, a preferable mode is one wherein the host computer is provided with a print er database capturing section to get data from the database of the printer for calculating the warm-up time of the printer.

According to a third aspect of the present invention, there is provided a printing system comprising a host computer and a printer performing printing after receiving printing data from the host computer;

the host computer having a printing data generation time calculating section for calculating time to generate the printing data and a warm-up command outputting section for sending a warm-up command to the printer for starting warming-up;

the warm-up command outputting section sends the time for producing the printing data calculated by the printing data generation time calculating section to the printer together with the warm-up command, the printer is provided with a warm-up time calculating section for calculating warm-up time and a timer to control the starting timing of the warm-up so that warming-up is terminated at the same time or before the generation of printing data is terminated.

In the foregoing, a preferable mode is one wherein the timer controls the time from receiving a warm-up command from the host computer to starting warming-up.

Also, a preferable mode is one wherein the host computer is provided with a current temperature capturing section to get temperature information of the printer and wherein a printer warm-up time calculating section calculates warm-up time by using temperature information taken by a current temperature capturing section.

Also, a preferable mode is one wherein the printer is provided with a temperature change monitoring section to monitor a temperature change from the start of warming-up and wherein the host computer is provided with a temperature change information registering section which gets temperature change information from the temperature change monitoring section and registers, and wherein the printer warm-up time calculating section calculates warm-up time by using temperature change information registered to this temperature change information registering section.

Furthermore, a preferable mode is one wherein the printer is provided with a temperature change monitoring section for monitoring a temperature change from the start of warming-up and wherein the warm-up time calculating section calculates warm-up time by using temperature change information registered to the temperature change information registering section.

BRIEF DESCRIPTION OF THE DRAWING

The above and other objects, advantages and features of the present invention will be more apparent from the following description taken in conjunction with the accompanying drawings in which:

FIG. 4 is an explanatory diagram (No. 1) showing specific examples of the printer driver;

FIG. 5 is also an explanatory diagram (No.2) showing specific diagram;

FIG. 6 is an explanatory diagram showing power consumption of the printer;

FIG. 19 is an explanatory diagram showing operations of the warm-up time calculating section;

FIG. 20 is a flowchart showing operations of the host computer according to the fifth embodiment;

FIG. 21 is a flowchart showing operations for calculating the time required for the printer warming-up;

DETAILED DESCRIPTION OF THE PREFERRED EMBODIMENTS

Best modes of carrying out the present invention will be described in further detail using various embodiments with reference to the accompanying drawings.

First Embodiment

According to a first embodiment, printing data generating time and warm-up time of a printer are calculated by a host computer. The timing at which a warm-up command is fed to a printer from the host computer is controlled so that timing for the termination of the warm-up coincides with that for termination of the generation of printing data.

Figure 1:
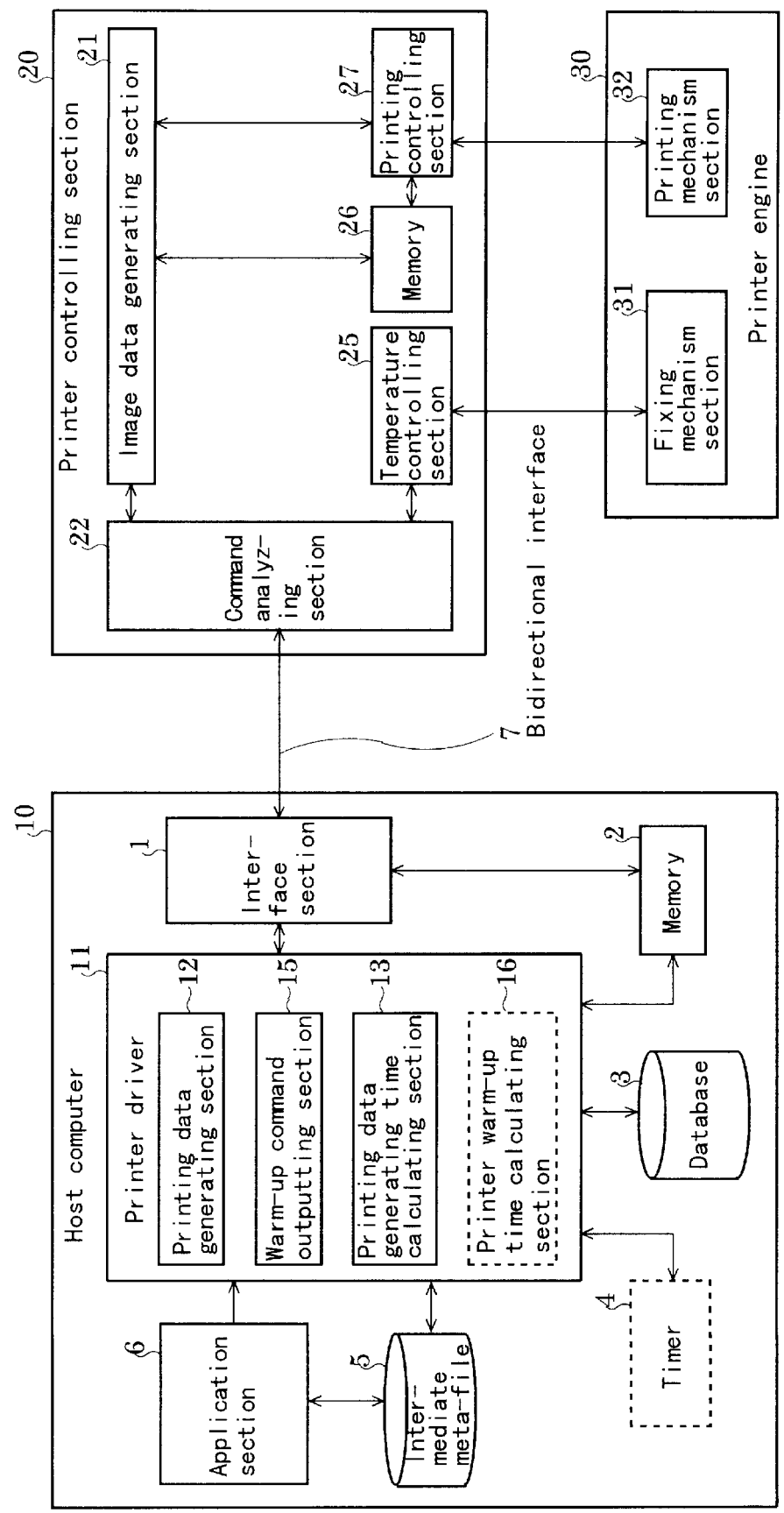
FIG. 1 is a block diagram showing a printing system according to a first embodiment of the present invention.

FIG. 1 is a block diagram showing a printing system according to a first embodiment of the present invention.

Referring to FIG. 1, a host computer 10 transfers printing data to a printer controlling section 20 to request printing. The host computer may be various equipment including a personal computer, a word processor or the like which can be used to generate the printing data. The host computer 10 is provided with an interface section 1, a memory 2, a database 3, a timer 4, an intermediate meta-file 5, an application section 6 and a printer driver 11.

The printer driver 11 contains a printing data generating section 12, a warm-up command outputting section 15, a printing data generating time calculating section 13 and a printer warm-up time calculating section 16. To the interface section 1 of the host computer 10 is connected a printer controlling section 20 through a bidirectional interface 7. The printer controlling section 20 is connected to a printer engine 30. The printer controlling section 20 consists of an image data generating section 21, a command analysis section 22, a temperature controlling section 25, a memory 26 and a printing controlling section 27. The printer engine 30 has both a fixing mechanism section 31 and a printing mechanism section 32.

The interface section 1 controls the transfer of commands used to control the printer, from the host computer to the printer. It also controls the transfer of the printing data from the host computer to the printer through the bidirectional interface 7. The interface section 1 may be composed of, for example, a Centronics Interface or a parallel interface and the like. The memory 2 is a memory device to temporarily store printing data and the like. The database 3 is composed of a non-volatile memory to store information required for calculating the warm-up time of the printer described later.

The timer 4 has a function as a watch which is used to calculate the predetermined timing at which a warm-up command is outputted. The timer 4 may be either a software timer or a hardware timer. The intermediate meta-file 5 is composed of a memory device to temporarily store the data produced intermediately during the conversion of printing data produced by the application section 6 to data having a format to be transferred to the printer.

The application section 6 is comprised of various application programs used to generate printing data. The printing data generating section 12 mounted on the printer driver 11 is a section having a function of generating printing data to be transferred from the intermediate meta-file 5 to the printer.

The warm-up command outputting section 15 is a section to control the outputting, through the interface section 1, of the warm-up command used to start the warming-up of the printer. The printing data generating time calculating section 13 is a section to analyze contents of the intermediate meta-file 5 in the way as described later and to calculate the time required by the printing data generating section 12 for terminating the generation of the printing data. The printer warm-up time calculating section 16 is a section to calculate the time required by the printer for starting the warming-up and for terminating it by using predetermined information stored in the database 3.

Moreover, the printer driver 11 includes combined programs installed in each of sections shown in FIG. 1. The timer also includes a program counter and the like.

The command analysis section 22 mounted on the printer controlling section is used to analyze contents of commands fed through the bidirectional interface 7 from the host computer and to decide operations to be performed by the printer. The image data generating section 21 is a section to convert the printing data transferred from the host computer to a format in which printing is made possible by the printer. The converted data is stored in the memory 26.

The printing controlling section 27 is a section to control the printer engine 30 and to perform the printing. The printing mechanism section 32 is provided with a paper transferring mechanism, a printing head and other mechanisms. The fixing mechanism section 31, if the printer engine 30 is used for, for example, an electrophotographic printer, may be composed of a mechanism to fix and process a toner image transferred to a sheet of printing paper. On this section are mounted a heater and the like and, when the heater reaches a predetermined temperature, the printing is made possible. Of various components of the printer including the printer engine 30, the fixing mechanism section 31 consumes the power most and therefore its warm-up time becomes a problem in each embodiment described later. Any section whose power consumption of which is larger after being warmed up compared with that during idle presents the same problem, which is discussed later as well.

A warm-up command outputted from the warm-up command outputting section 15 of the host computer is received by the command analysis section 22. By controlling the command analysis section, the fixing mechanism section 31 starts warming-up. When the temperature is raised by the warming-up till the fixing is possible, the temperature controlling section 25 detects the temperature. The time after receiving the warm-up command till the completion of the warm-up is hereafter called "warm-up time". Moreover, in the database 3 of the host computer 10 is stored the time required by the printing data generating section 12 of the printer driver 11 for converting each graphics-drawing data stored in the intermediate meta-file 5 to the printer command. Its specific contents are described later in detail. Usually, the application section 6, when the printing is started, designates the kinds of printing paper to be used in the printer. In the database 3 are stored data on the fixing temperature and warm-up time for each kind of the printing paper designated by the application section 6. The warm-up time for printing on large-sized printing paper is longer than that for printing on small-sized printing paper because the fixing equipment in the former case must be warmed up more widely compared with the latter case. Its specific contents are described later.

Figure 2:
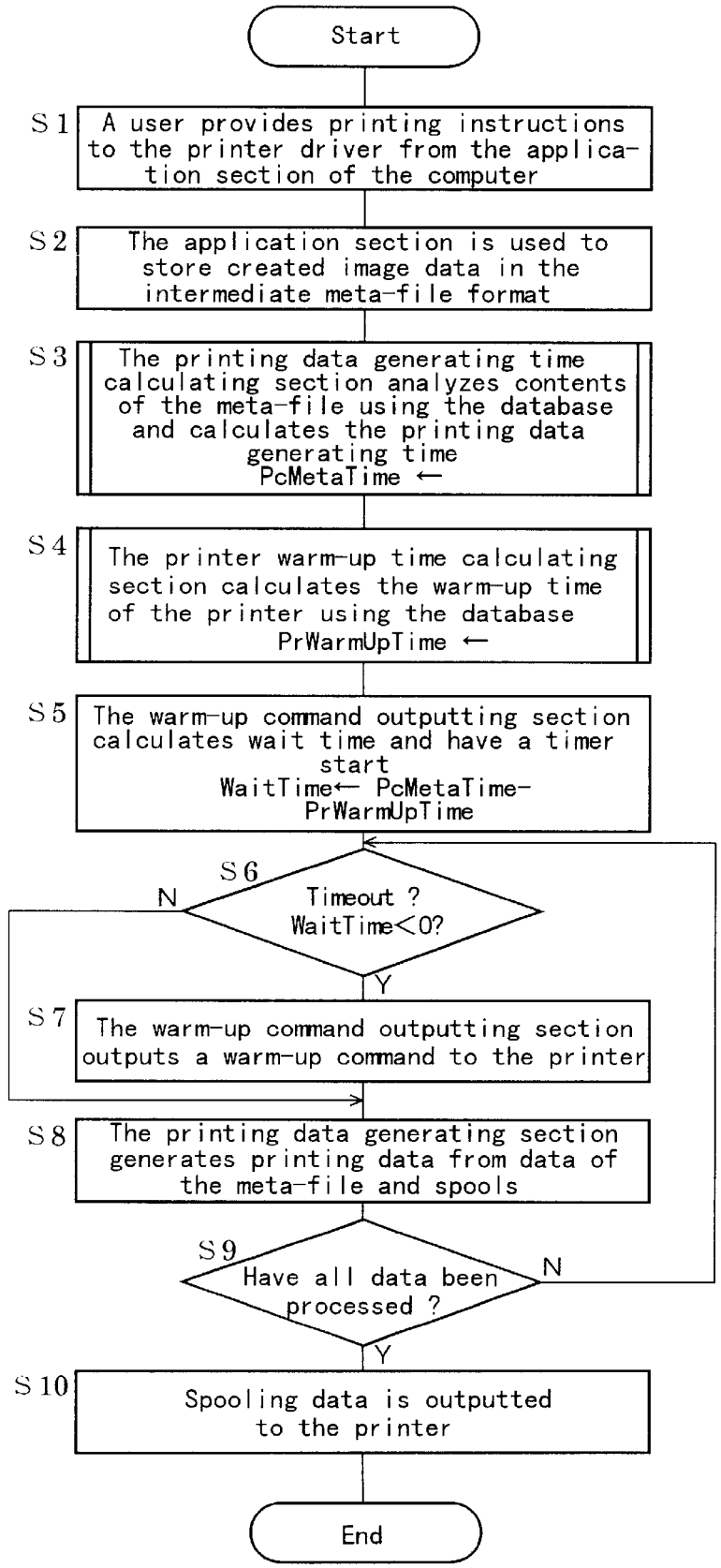
FIG. 2 shows a flow chart describing operations of the host computer of the first embodiment.

FIG. 2 shows a flow chart describing operations of the host computer of the first embodiment.

First, when the host computer 10 causes a printer to execute printing, the application section 6 provides printing instructions to the printer driver 11 (step 1). At the same time, the application section 6 stores image data to be printed in the intermediate meta-file format (step 2). The printing data generating time calculating section 13 of the printer driver 11 analyzes contents of the data of the intermediate meta-file by using the database 3 and calculates printing data generating time. The calculating result is stored in PcMetaTime (variable). The printer warm-up time calculating section 16 of the printer driver calculates the warm-up time by using the data base (step 4). The calculating result is stored in PrWarmUpTime (variable).

Next, the warm-up command outputting section 15 calculates wait time and causes the timer 4 to start. The wait time (variable) is equal to the value obtained by deducting the warm-up time PRWarmUpTime from printing data generating time PcMetaTime. In step S6, the time 4 is monitored. Whether a timeout has occurred or not is judged. If the timeout has not occurred, the operation goes from step S6 to step S8 and the printing data generating section 12 generates printing data from the intermediate meta-file 5 and spooling operations are continued.

In step S9, whether all data are processed is judged. The processing in the step S8 is repeated until data of all intermediate meta-files 5 are processed. In the step S6, if it is judged that the timeout has occurred, the operation goes to step S7 and the warm-up command outputting section 15 outputs a warm-up command to the printer. After the printing data generating section 12 finishes the processing of data of all intermediate meta-files, the operation goes to step S10, and spooled printing data is outputted to the printer through the interface section 1.

Figure 3:
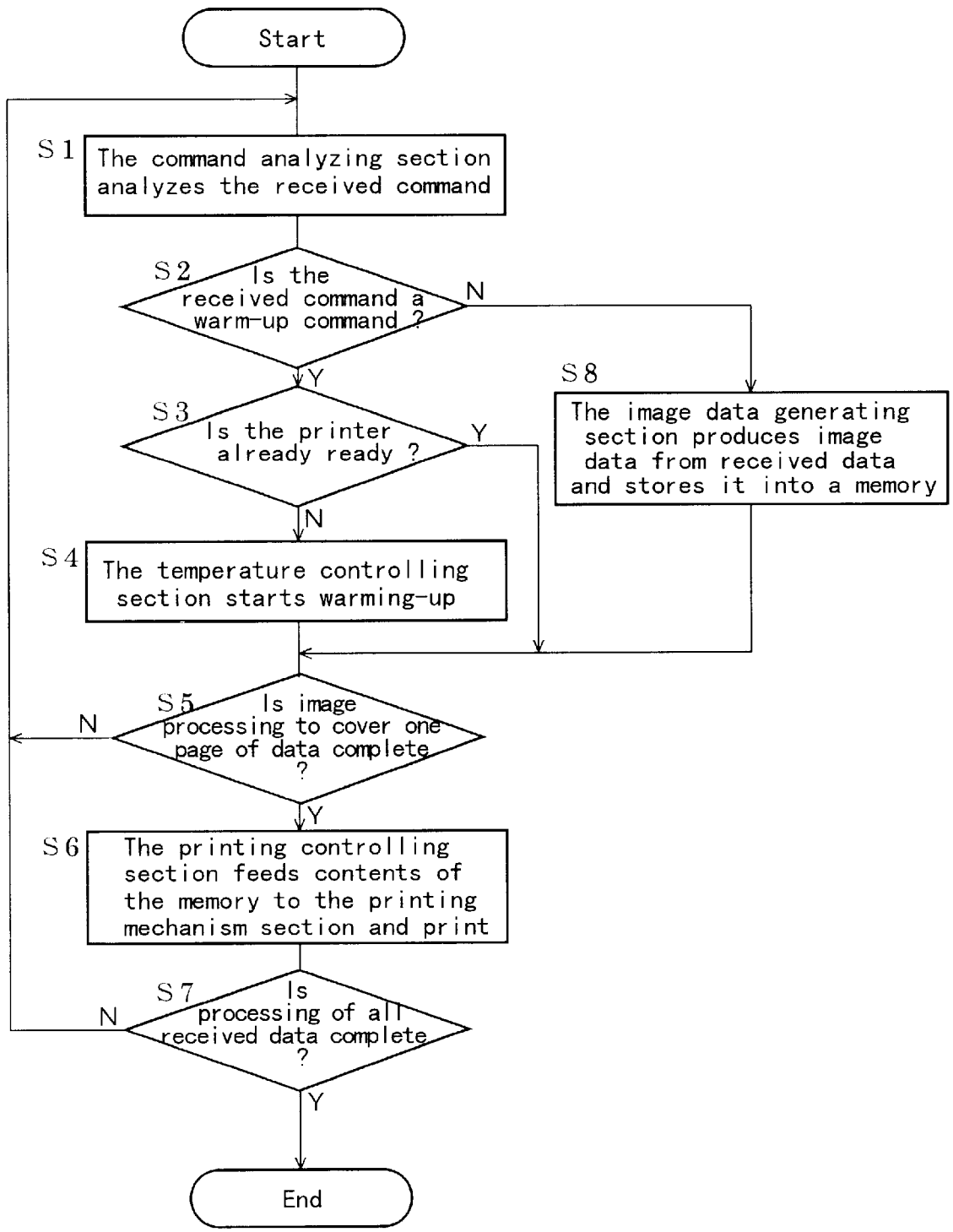
FIG. 3 is a flowchart showing operations of the printer of the first embodiment.

FIG. 3 is a flowchart showing operations of the printer of the first embodiment.

Data received by the printer from the host computer through the bidirectional interface 7 is analyzed by the command analysis section 22 (step S1). The command analysis section 22 first judges whether the received command is a warm-up command (step 2) or not. If it is not the warm-up command, a user goes to step S8.

In step S8, the image data generating section 21 generates image data from the received data and stores it into the memory 26. In step S5, whether image processing to cover one page of data is complete or not is judged and if it is not complete, the operation returns back to step Si and the processing from step S1 to step S8 or to step S4 is carried out.

In step S2, if the received command is judged to be a warm-up command, the operation goes to step S3. At this point, whether the printer is in a ready state or not is determined. The state being ready is different from a state being on idle and is a state where the warm-up is complete. If the warm-up is complete, the operation goes to step S5 and whether the image processing to cover one page of data is complete or not is judged.

According to the present invention, control is made so that timing at which the generation of printing data is complete in the host computer almost coincides with timing at which the warm-up is complete in the printer. Accordingly, the warm-up operation is started at a predetermined timing before the completion of generation of the printing data. That is, if the operation goes from step S3 to step S4, the temperature controlling section 25 starts warming-up of the fixing mechanism section 31.

In the embodiment, the time required by the image data generating section 21 of the printer controlling section 20 for processing of the conversion from printing data to image data, or the time required for processing of the expansion to the memory 26 are not taken into account, because it is assumed that the time is sufficiently negligible when it is compared with the time required for generating printing data in the host computer 10. Therefore, if the time required by the image data generating section 21 in the host computer for the processing is too long to be negligible, it is necessary for the printing data generating time calculating section to calculate by taking them into consideration.

In this embodiment, the following risk is taken into consideration; that is, when the time required for generating printing data in the host computer is long, if the warm-up is complete earlier, the idle time in the ready state becomes long, resulting in wasting power. To avoid this, the printing data generating section 12 of the host computer 10 is adapted first to generate the printing data and then to cause the warm-up command to be sent, at a predetermined timing, to the printer and the temperature controlling section 25 of the printer controlling section 20 to start warming-up.

When processing of storing image data in the memory 26 is complete in the printer, the operation goes from step S5 to S6. Then, the printing controlling section 27 feeds contents of the memory 26 to the printing mechanism section 32 to start printing. In step S7, whether processing of all received data or of printing is complete or not is judged. If it is not complete, the operation returns again back to step S1 and processing described above is repeated again.

FIG. 4 is an explanatory diagram (No. 1) showing specific examples of the printer driver. FIG. 5 is also an explanatory diagram (No.2) showing specific diagram.

By referring to these drawings, specific contents of the calculation of printing data generating time and of printer warm-up time are described in detail.

FIG. 4 (a) shows a calculation formula to calculate the wait time described in step S5 in FIG. 2. The wait time shown as the left side of the formula is equal to a value obtained by deducting the warm-up time of the printer shown in the right position of the right side of the formula from the printing data generating time shown in the left position of the right side. The printing data generating time is calculated using the database as shown in FIG. 4(b). As shown in FIG. 4(b), the processing time required for converting the data of the intermediate meta-file 5 to printing commands varies depending on graphics-drawing functions to be used. The processing time can be predicted in advance as shown in the table in FIG. 4(a).

For example, as shown in FIG. 4(b), in the case of having a function of graphics-drawing of a text (character), the processing time is one millisecond per one character. Also, in the case of having a function of graphics-drawing of a line, the processing time is 10 milliseconds per one line. Accordingly, the time required for generating the whole printing data can be calculated by taking out the data of the meta-file in order, judging the graphics-drawing function of the data and accumulating the processing time by referring to the above database. The example of this calculation is shown in FIG. 4(c).

FIG. 4(c) shows an operational formula. This formula shows that the printing data generating time can be obtained by accumulating, in order, the product of the number of characters of the text and the processing time for one character of the text, the product of the number of lines and the processing time for one line and the product of the number of circles and the processing time for one circle and so on.

Let it be assumed that the printing data, for example, contains 2400 characters, 100 lines, 2 circles, 20 curves, 4000 pixels, 10 images and 200 of other graphics-drawing functions, as shown in FIG. 5(a). As shown in FIG. 5(b), the printing data generating time is 52800 milliseconds.

On the other hand, the warm-up time varies depending on the thickness or materials of printing paper set on the printer. In the case of thick printing paper, the fixing device is set to somewhat higher temperature. Accordingly, if a command designating the selection of a tray is outputted from the host computer to the printer, the host computer 10 calculates the warm-up time in accordance with the command. FIG. 5(c) shows these relations. The data is stored in the database of the host computer 10.

For example, as shown in FIG. 5(c), in the case of printing on thick paper, the warm-up time is 6 seconds. Also, in the mode of printing on thin paper, the fixing time is 150° C. and the warm-up time is 45 seconds. The table is so prepared that each kind of paper to be printed corresponds to its warm-up time. Therefore, the printer warm-up time calculating section 16 can calculate the warm-up time only by referring to this table.

By using the formula shown in FIG. 5(b), the printing data generating time can be calculated. If printing is made on thin paper, the warm-up time is 45 seconds. According to the formula shown in FIG. 4(a), the wait time being 7.8 seconds is obtained. This means that a warm-up command is sent to the printer 7.8 seconds after the start of the generation of the printing data. This causes the timing of terminating the warming-up to coincide with the timing of terminating the generation of printing data and printing to be started within a short idle time.

Similarly, in the case of printing on thick paper designated by the printing data, as shown in FIG. 5(c), the warm-up time is 68 seconds. By using the formula in FIG. 4(a), the wait time of −15.2 seconds is obtained. This means that a warm-up command has to be sent to the printer 15.2 seconds before the start of the transfer of the printing data.

If printing is requested by the application section 6 operating on the host computer, a printing instruction is fed from the application section to the printer driver 11 of the host computer. Immediately after receiving this instruction, the printer driver 11 starts to generate the printing data. Because of this, by sending the warm-up command to the printer at the same time or immediately after the start of the generation of printing data, the timing of terminating the warming-up can coincide with the timing of terminating the generation of the printing data. Accordingly, the case can be eliminated that the printing data is not transferred from the host computer notwithstanding the fact that the printer is in the ready state, i.e., the warm-up is already complete.

That is, the host computer 10 preferably sends out the warm-up command at optimum timing so that the generation of the printing data is completed, at least, at the same time when the warm-up of the printer is terminated or before the warm-up is complete.

FIG. 6 is an explanatory diagram showing power consumption of the printer to explain the effect of the above control.

As shown in FIG. 6, the printer is in a power-saving state, in an idle state or in a printing state. In the power-saving state, the power for the printer is turned ON, however, only logic functions that can receive a command from the host computer are operating. Therefore, in a small-sized printer, its power consumption measures 5 W and in a large-sized printer, its power consumption measures 18 W.

At this point, if the warm-up command is inputted, the warming-up is started and the fixing mechanism section 31 is heated up to a temperature at which printing is possible. The state in which the printing can be done immediately is called an idle state. In the idle state, the logic function and the fixing mechanism section 31 are operating as shown in FIG. 6. In a small-sized printer, its power consumption measures 30 W and in a large-sized printer, its power consumption measures 61 W.

During the printing operation, a motor is driven to convey the printing paper. As shown in FIG. 6, the logic function, a heater and a motor are operated accordingly. In a small-sized printer, its power consumption measures 100 W and in a large-sized printer, its power consumption measures 215 W. As is apparent from FIG. 6, the power consumption increases three times to six times. Therefore, if the printer continues to be in the idle state after receiving the warm-up command and waits for the inputting of the printing data for a long time, the power is wasted.

According to the embodiment, since the printing data generating time and the warm-up time are in advance calculated and the warm-up command is sent to the printer at the timing of the termination of the generation of the printing data, at least, at approximately the same time when the warming-up is terminated or before the warming-up is complete, the time when the printer is in the idle state can be reduced sufficiently, thus providing a printing system with less power consumption.

Moreover, in the above embodiment, whatever contents of the warm-up command may be used only if it is an instruction to provide a chance of starting the warming-up of the printer. It is not necessary for the instruction to have the name of the "warm-up command". The command may be an instruction that can be used for common use with other instructions. Any command may be used if it can provide a chance of starting the warming-up of the temperature controlling section 25 or the fixing mechanism section 31. Moreover, the time required for generating the printing data may be calculated by taking into consideration data amount and other various parameters in addition to factors described above.

Second Embodiment

Figure 7:
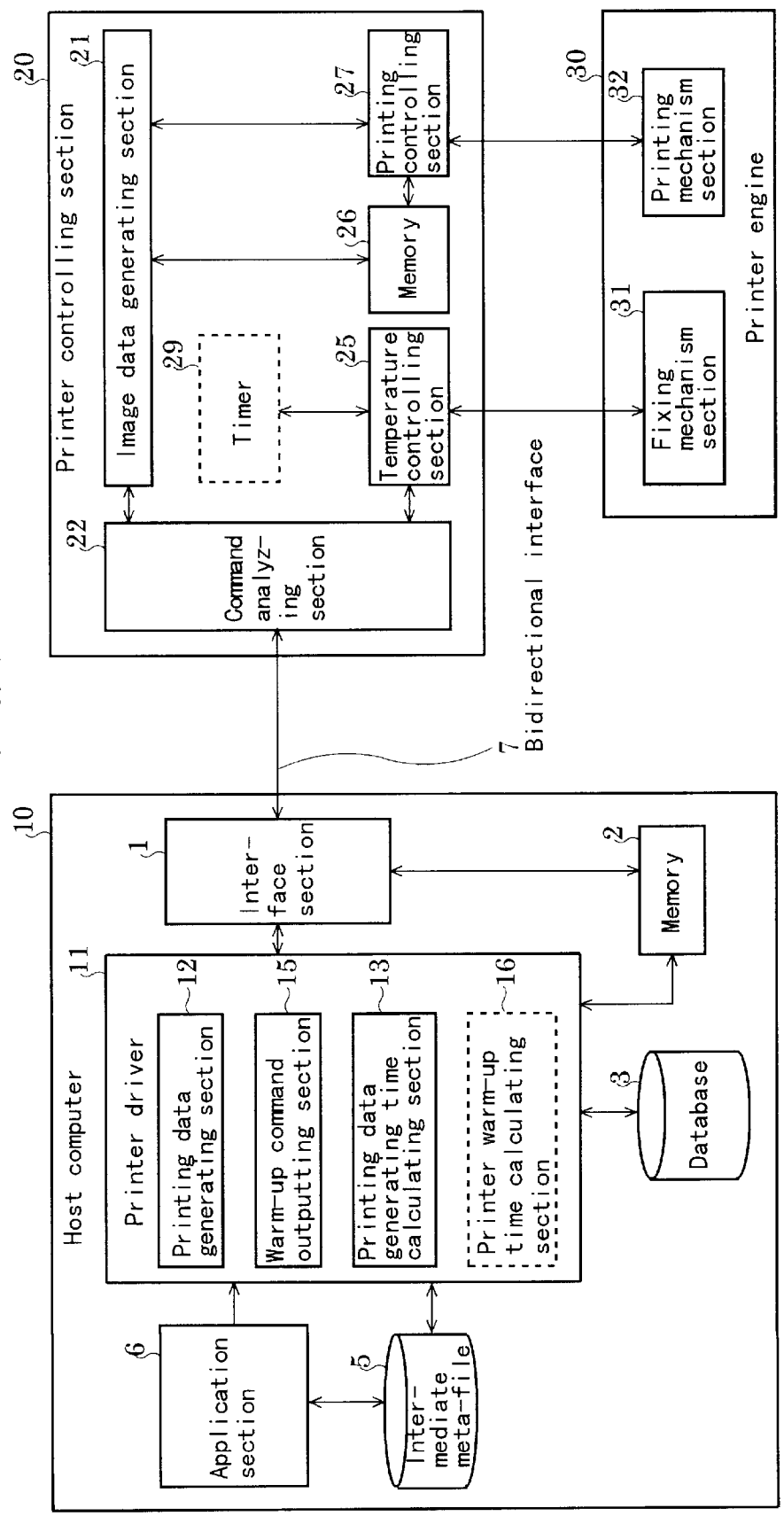
FIG. 7 is a block diagram showing a printing system according to a second embodiment of the present invention.

FIG. 7 is a block diagram showing a printing system according to a second embodiment of the present invention. Comparing configurations in FIG. 7 with those in FIG. 1, only different parts between them are described below. The configurations of the host computer 10 in FIG. 7 are approximately the same as those shown in FIG. 1 except the timer. In the second embodiment, the printing data generating time and the printer warm-up time are calculated by the host computer, and the idle time obtained by the calculation and the wait time described in the first embodiment are sent to the printer together with the warm-up command. When the warm-up command is received by the printer, the warming-up is not started immediately and the timing of starting the warming-up is delayed by the idle time.

According to the second embodiment, the printer controlling section 20 is provided with a timer 29 to measure the idle time. The temperature controlling section 25 is so configured that it causes the fixing mechanism section 31 to be driven, by the control of the timer 29, at a predetermined timing. Operations of the printing system shown in FIG. 7 are described below.

Figure 8:
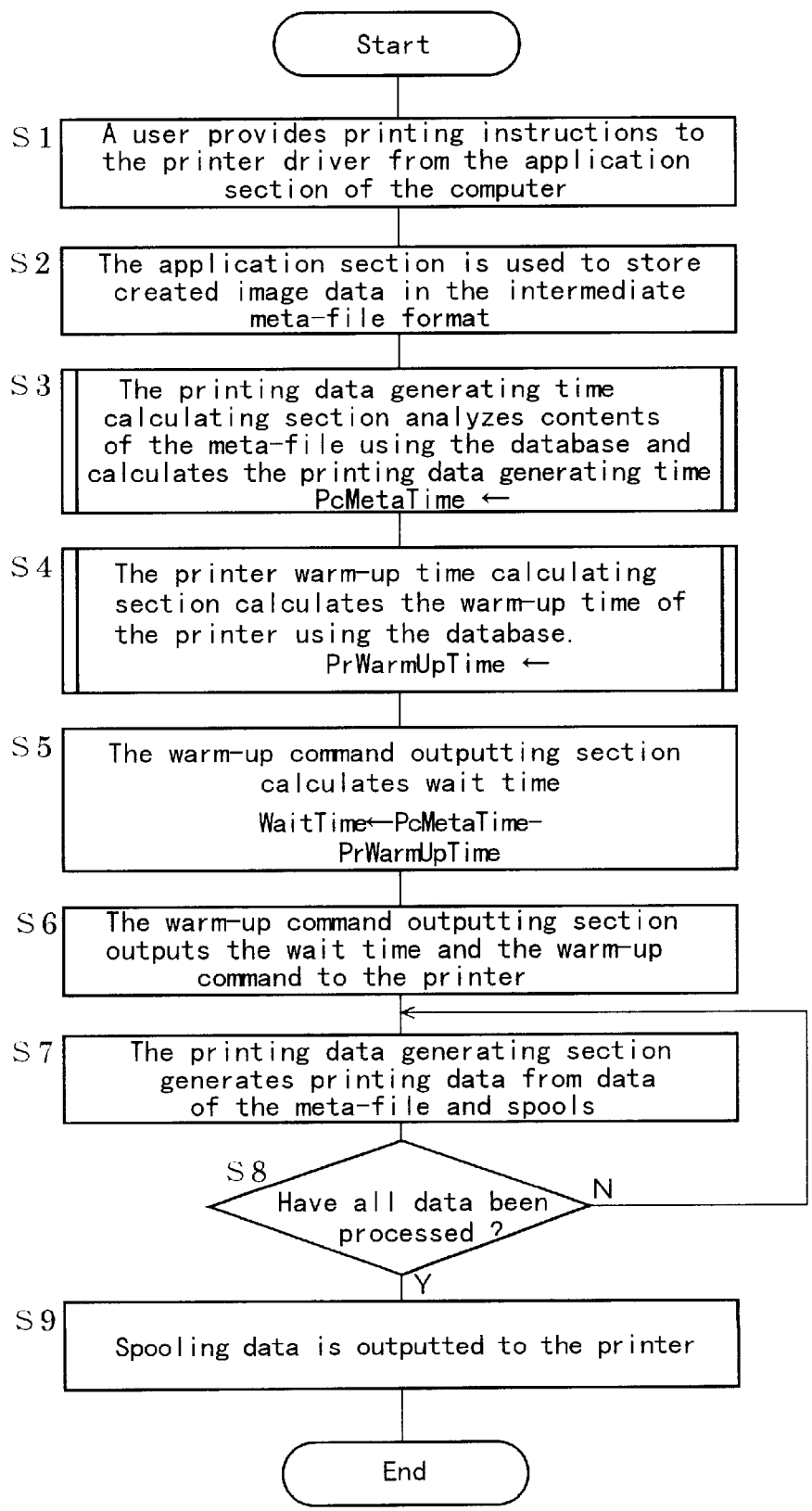
FIG. 8 is a flowchart showing operations of a host computer according to the second embodiment of the present invention.

FIG. 8 is a flowchart showing operations of a host computer according to the second embodiment of the present invention. Most of the processing shown in FIG. 8 is the same as that shown in FIG. 2 of the second embodiment. In step S6, the warm-up command outputting section 15 is adapted to output the warm-up command, to which information showing the idle time (wait time) has been added, to the printer.

That is, the warm-up command is outputted to the printer before the generation of printing data is started by the printing data generating section 12. At this point, the wait time obtained in step S5 is sent to the printer.

Figure 9:
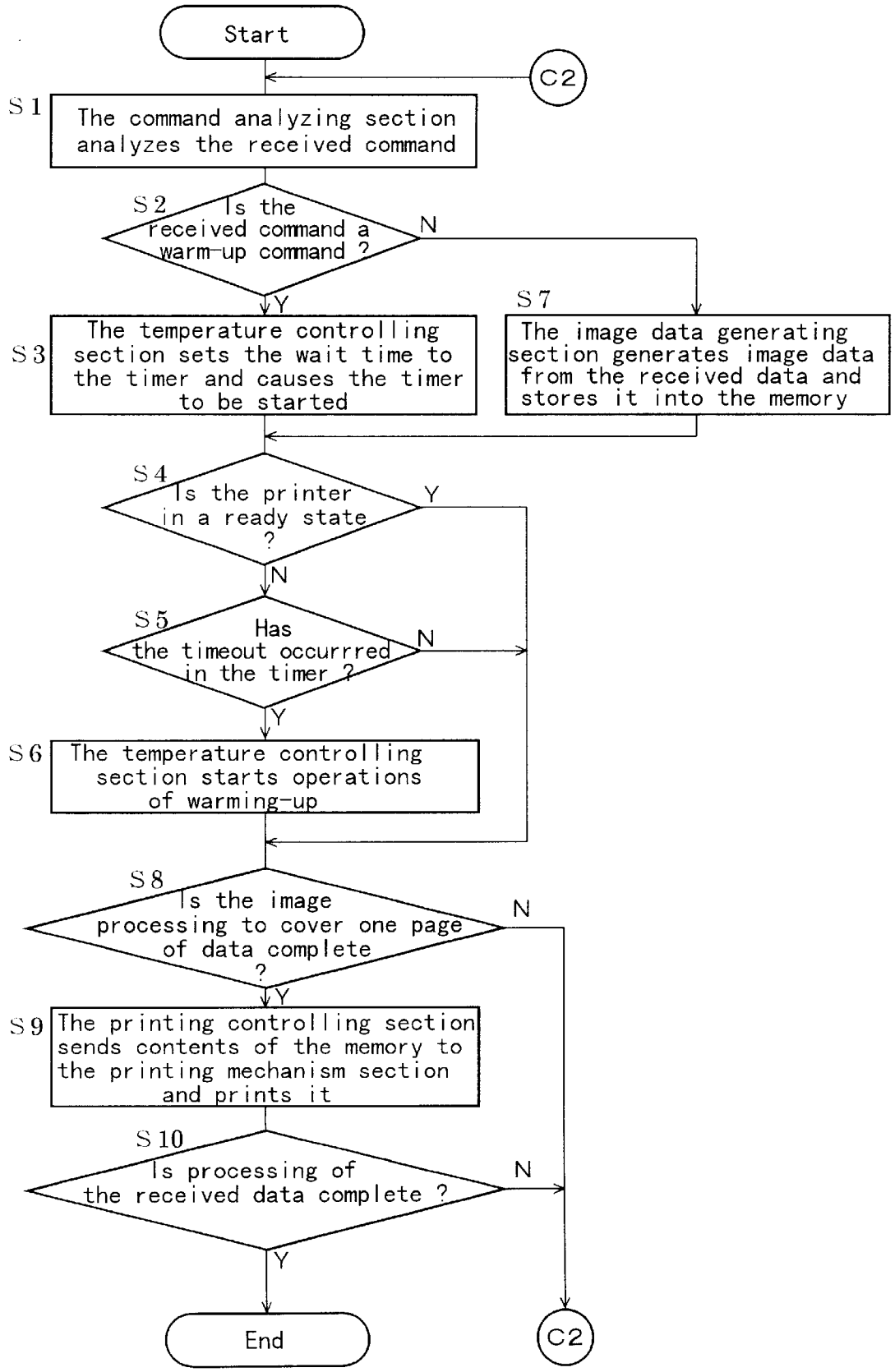
FIG. 9 is a flowchart showing operations of the printer of the second embodiment.

FIG. 9 is a flowchart showing operations of the printer of the second embodiment. In the operations shown in FIG. 9, the processing is the same as that shown in FIG. 3 of the first embodiment except steps S3 to S6 which are additionally incorporated as changed steps.

That is, in step 1, the received command is analyzed. In step 2, if the received command is judged to be a warm-up command, the operation goes to step S3 where the temperature controlling section 25 sets the wait time to the timer 29, having the timer driven. That is, the warming-up is not started immediately by the receipt of the warm-up command and the timer 29 is caused to measure the idle time. In step S4, whether the printer is in the ready state or not is judged and if it is in the ready state, the operation goes to step S8. If the printer is not in the ready state, the operation goes to step S5 and whether a timeout has occurred in the timer is judged. If no timeout has occurred, the operation returns back to step S1 through the step S8.

If the timeout has occurred, the operation goes to step S6 and the temperature controlling section 25 starts operations of warming-up. The timer 29 measures the time being equivalent to the idle time and, after the time elapses, the warming-up is started. This provides the same effect as that obtained by the measurement of the time by the host computer and by the sending of the warm-up command to the printer in the first embodiment. Other processing for steps S8, S9, S10 and the like is the same as those in the first embodiment.

Thus, the host computer calculates the idle time and sends out the calculation results to the printer which then adjusts the timing of starting the warming-up. By this, as in the case of the first embodiment, the control can be made so that the generation of the corresponding data is terminated, at least, at the same time when or before the warming-up is complete. Thus, the power consumption is reduced by avoiding the continuation of the idle state.

Third Embodiment

In this embodiment, the printer is provided with the database required when the warm-up time is calculated. The calculated results are captured by the host computer to calculate the warm-up time. The host computer captures necessary data every time printing is done, before the start of printing, from the printer to which printing data is fed. This configuration can provide convenience when the warm-up time varies depending on each printer.

Figure 10:
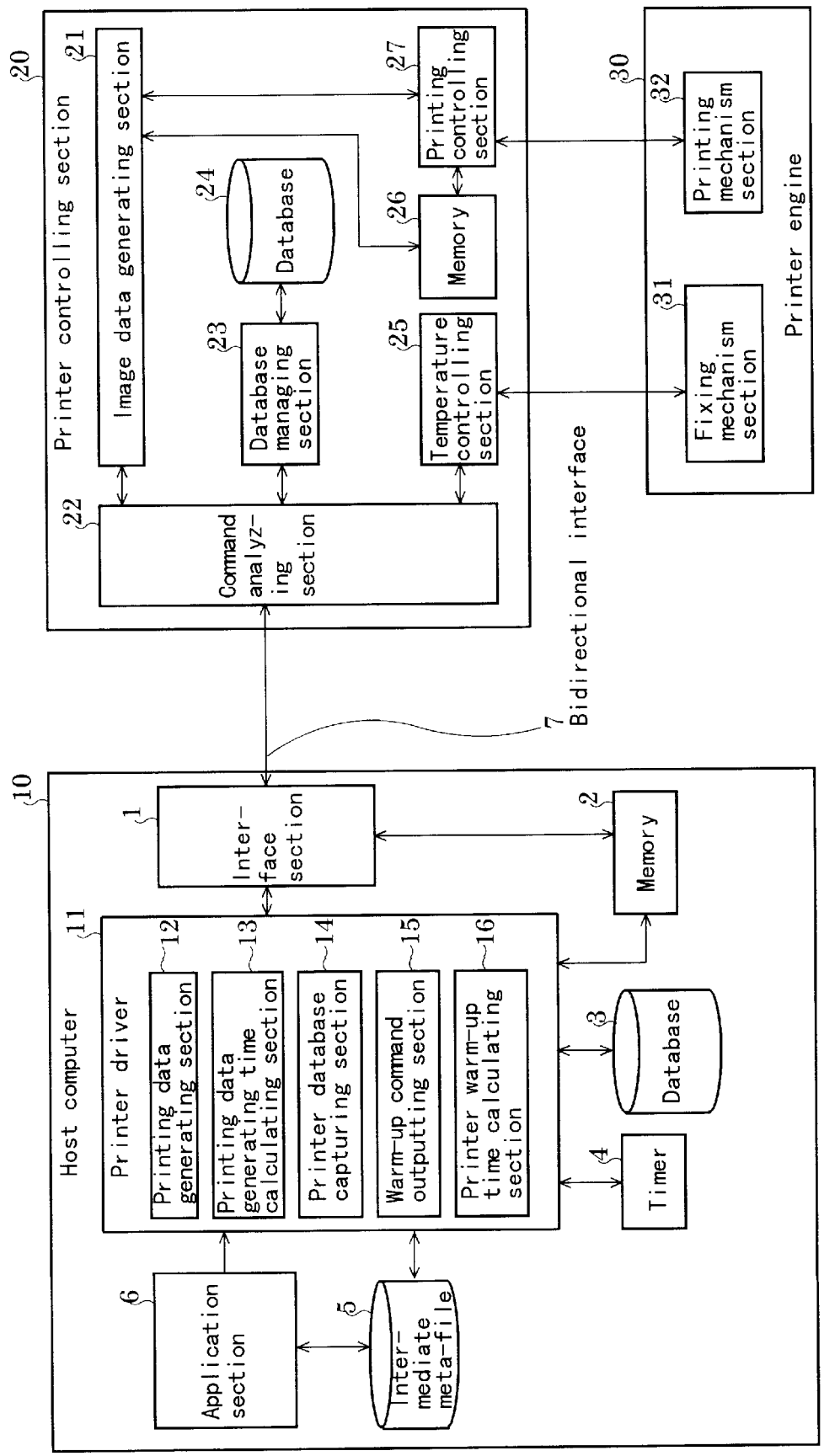
FIG. 10 is a block diagram showing a printing system according to a third embodiment.

FIG. 10 is a block diagram showing a printing system according to a third embodiment. The configurations of this embodiment differs from those in the first embodiment in that a printer database capturing section 14 is added to the printer driver 11 of the host computer and a database managing section 23 is mounted on the printer controlling section 20 as shown in FIG. 10.

In the database 24 is stored warm-up time data used to calculate the warm-up time described above. Its content is the same as described using FIG. 5(c). The database managing section 23 is a section to read out the warm-up data from the database and to send it to the host computer when a command for reading the database is inputted through the command analysis section 22.

The printer database capturing section 14 of the host computer 10 is a section to instruct the database managing section 23 of the printer controlling section 20 to provide the warm-up time data before the printer warm-up time calculating section 16 calculates the warm-up time and to get necessary warm-up time data to feed it to the printer warm-up time calculating section 16. Operations shown in the third embodiment are hereafter described.

Figure 11:
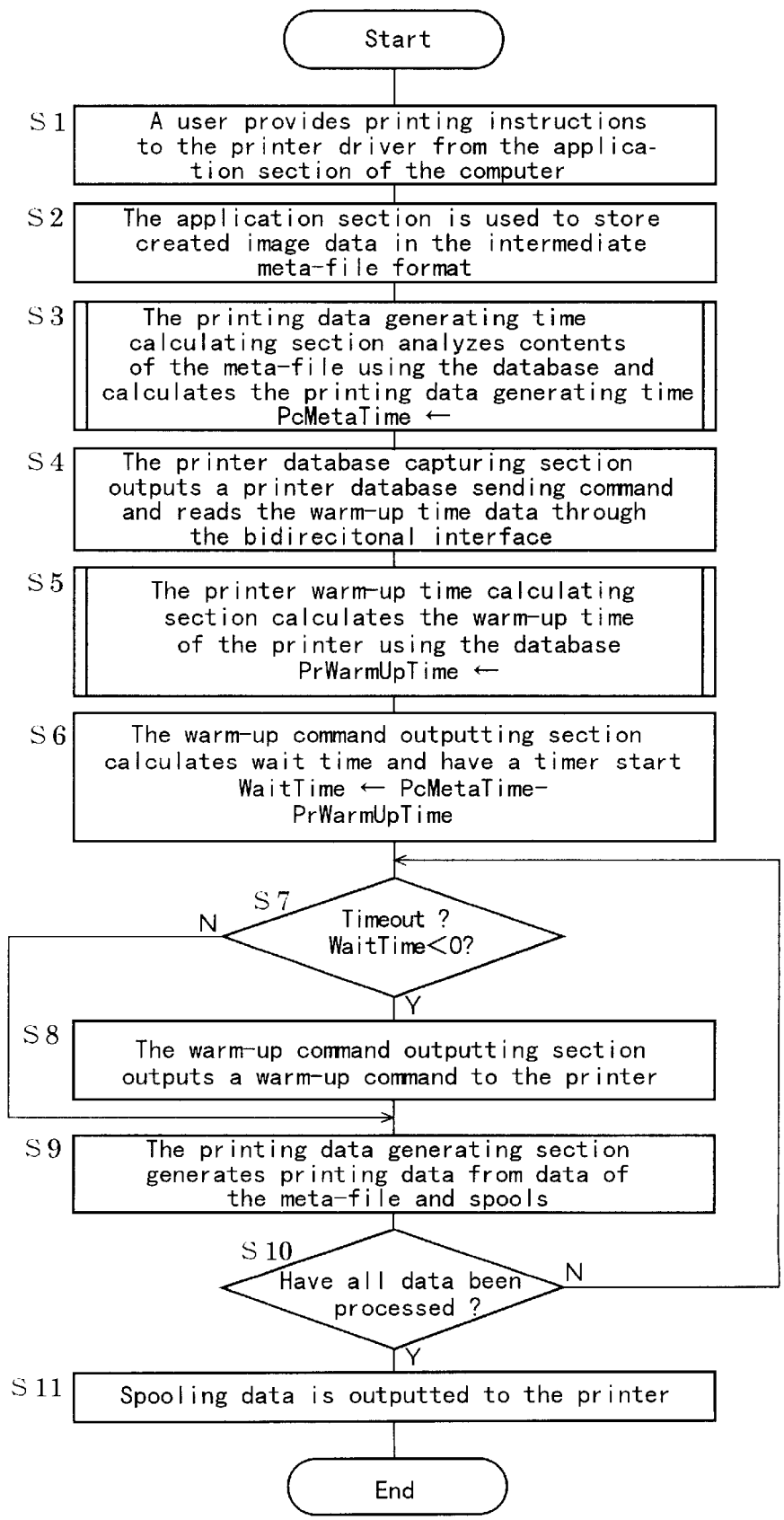
FIG. 11 is a flowchart showing operations of the printer of the third embodiment.

FIG. 11 is a flowchart showing operations of the printer of the third embodiment.

The procedures shown in FIG. 11 are comprised of all steps shown in FIG. 2 and additionally the step S4 shown in FIG. 11. In step S4 shown in FIG. 11, the printer database capturing section 14 is operated prior to the calculation of the printer warm-up time. The printer database capturing section 14 sends a printer database sending command to the database managing section 23 through the bidirectional interface 7.

The database managing section 23 reads out the warm-up time data from the database and returns it to the printer data capturing section 14. After the warm-up time data is read, in step S5, the printer warm-up time is calculated and then other procedures are performed in the same manner as in the first embodiment.

Figure 12:
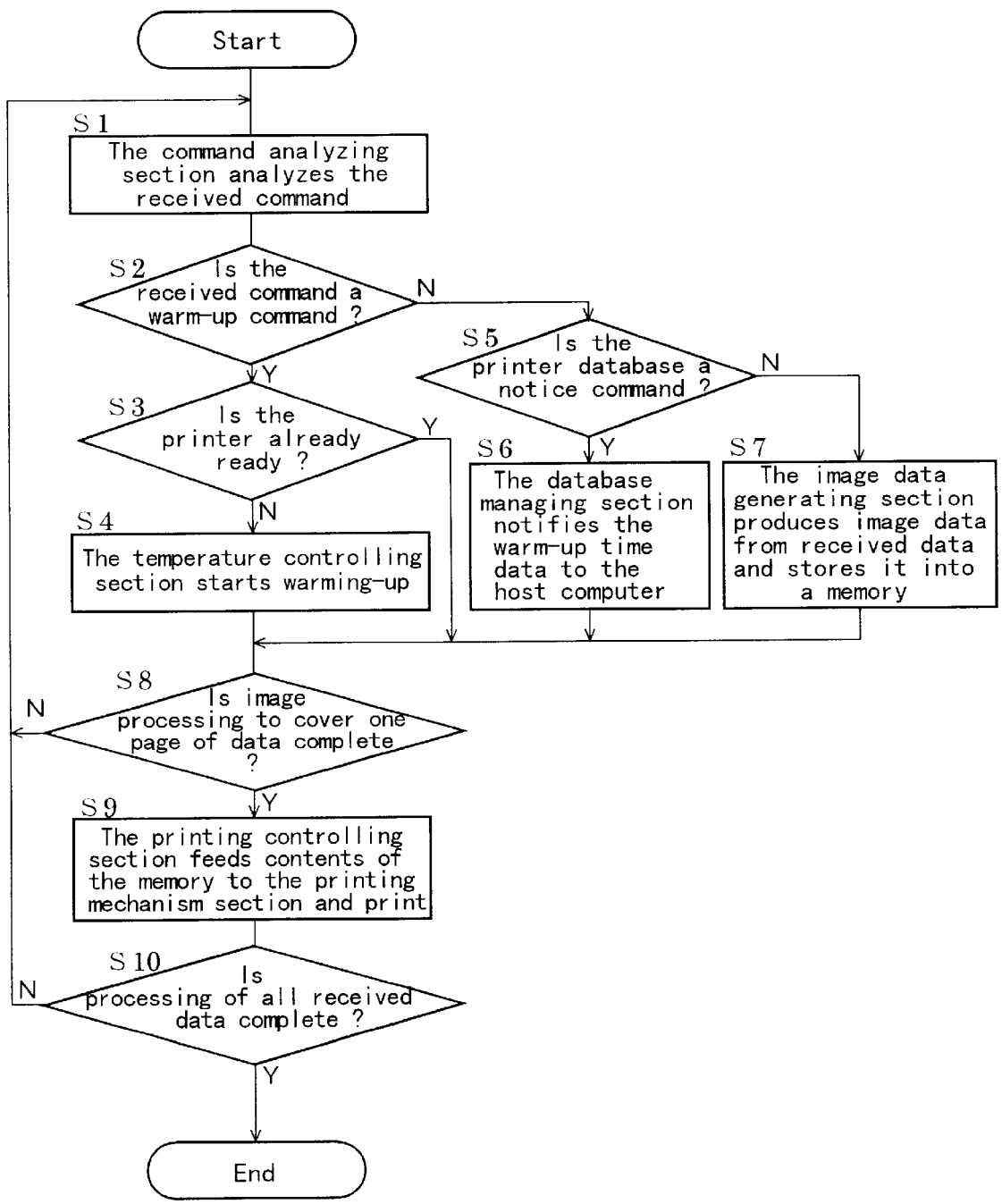
FIG. 12 is a flowchart showing operations of the printer according to the third embodiment.

FIG. 12 is a flowchart showing operations of the printer according to the third embodiment.

The procedures shown in FIG. 12 are comprised of all steps shown in FIG. 3 of the first embodiment and additionally the steps S5 and S6 shown in FIG. 12. That is, in step S2, if the received command is judged to be a warm-up command, the operation goes to step S5 and whether the received command is a printer database notice command or not is judged. If it is the printer database notice command, the operation goes from step S5 to step S6 and the database managing section 23 reads out the warm-up time data from the database 24, and then notifies it to the printer database capturing section 14 of the host computer 10. These procedures are added to those in FIG. 12 and other processing is the same as in the first embodiment.

Next, specific processing procedures of the printing data generation time calculating operation and the warm-up time calculating operation are described.

Figure 13:
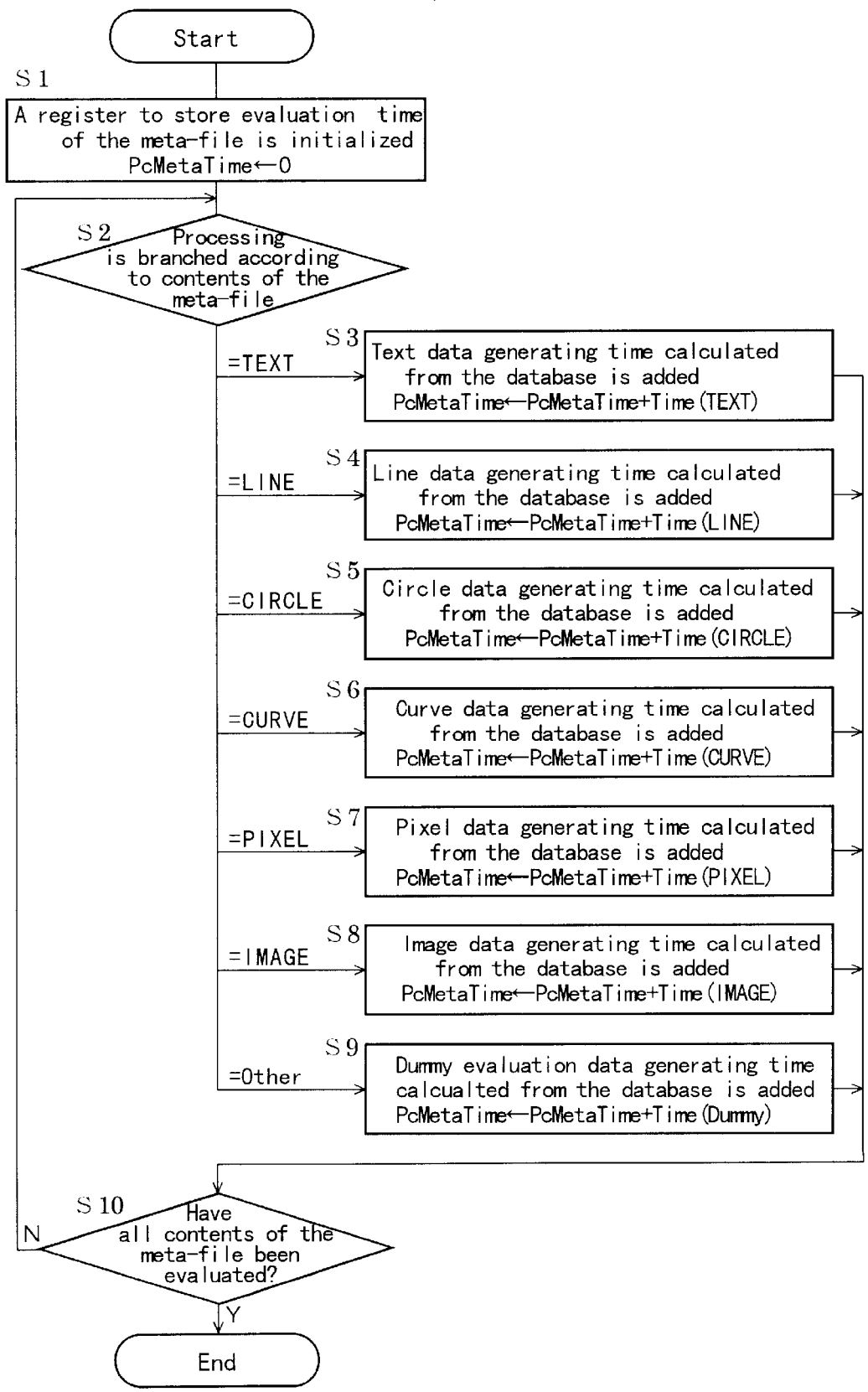
FIG. 13 is a flowchart of the printing data generation time calculating operation.

FIG. 13 is a flowchart of the printing data generation time calculating operation.

First, in step S1, a register in which the evaluation time of the metafile is stored is initialized. Then, in step S2, contents of the meta-file are read out in order and the processing is branched according to the contents.

The processing is branched depending on contents of the meta-file, for example, for a text, line, circle, circular arc, pixel and others. For example, in the case of the text, text data generating time is calculated from the database and the calculated result is added to the evaluation time of the meta-file.

In step S4, line data generating time is added. In step S5, circle data generating time is added. In step S6, curve data generating time is added. In step S7, pixel data generating time is added. In step S8, image data generating time is added. In step S9, dummy evaluation data generating time is added.

By performing processing as described above sequentially according to contents of the meta-file, the evaluation time of the meta-file is added accumulatively. The resulting time is printing data generating time. In step S10, whether all contents of the meta-file are evaluated or not is judged and then the operation returns back to step S2 and steps S3 to S9 are repeated. Thus, the printing data generating time is calculated.

Figure 14:
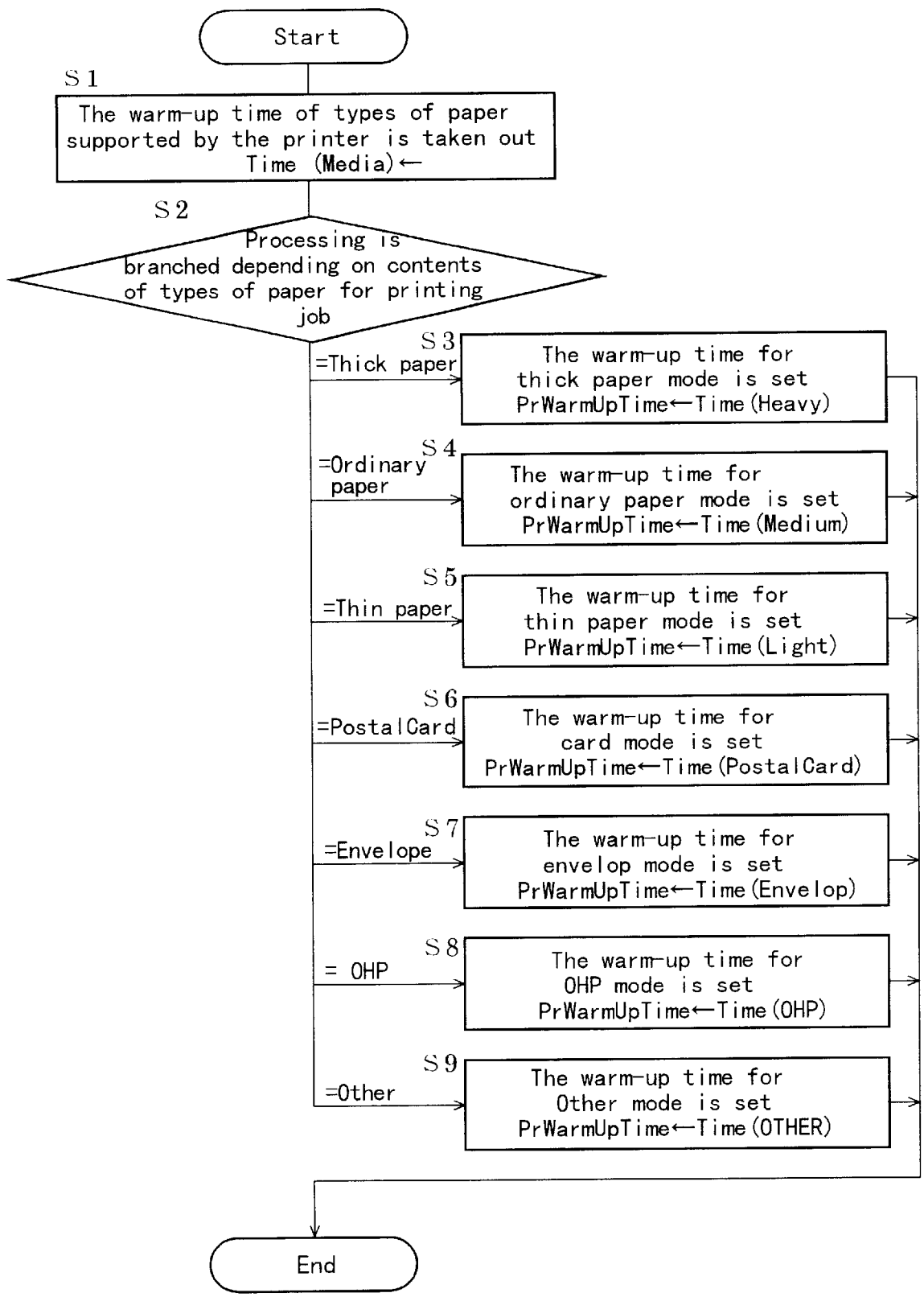
FIG. 14 is a flowchart showing operations of the printer warm-up time calculation.

FIG. 14 is a flowchart showing operation of the printer warm-up time calculation.

First, in step S1, warm-up time for all types of printing paper supported by the printer is taken out. The processing is branched depending on contents of the type of paper required for the printing job (step S2).

That is, in the case of thick paper, the operation goes to step S3. Similarly, in the case of ordinary paper, thin paper, card, envelope, OHP paper and others, it goes to step S4, S5, S6, S7, S8 and S9 respectively. The warm-up time is set depending on the type of paper. The calculation of the warm-up time is complete now. Not only in each embodiment described previously and other embodiments shown later, the printing data generating time and the warm-up time can be calculated by the same method of calculation as described above.

Thus, since the host computer captures the warm-up time to be exclusively applied to the printer from the database of the printer and calculates the warm-up time, when various printers are controlled, the invention of the first embodiment can be implemented without changing the program of the host computer.

Fourth Embodiment

In the fourth embodiment, the calculation of the warm-up time is carried out by the printer.

Figure 15:
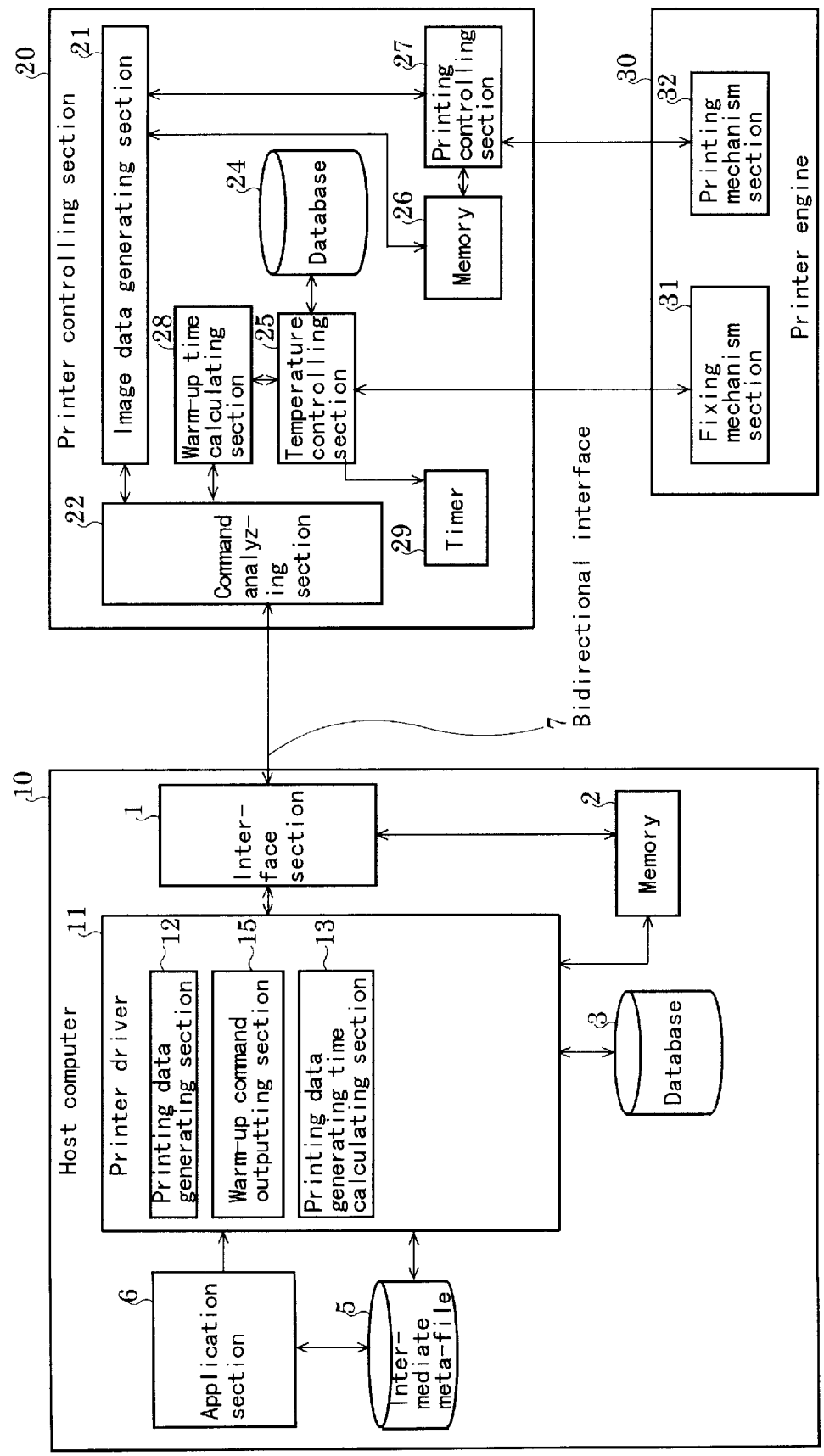
FIG. 15 is a block diagram showing a printing system according to the fourth embodiment.

FIG. 15 is a block diagram showing a printing system according to the fourth embodiment.

In this embodiment, the configuration of the printer driver 11 of the host computer is simpler than that in the first embodiment. That is, the printer warm-up time calculating section 16 or timer 4 provided in the first embodiment are excluded. On the other hand, the printer controlling section 20 is provided with a warm-up time calculating section 28, a database and a timer 29 in addition to components mounted in the first embodiment.

The database 24 stores the warm-up time data. The contents of the data is the same as those described in the third embodiment. The warm-up time calculating section 28 is a section to calculate the warm-up time according to contents of the database 24. The content of the calculation performed by this warm-up time calculating section is the same as that mounted on the host computer. The timer calculates the warm-up time adapted to make the start of warming-up delayed by a predetermined time after the receipt of the warm-up command. Operations of the system of the fourth embodiment are described hereafter.

Figure 16:
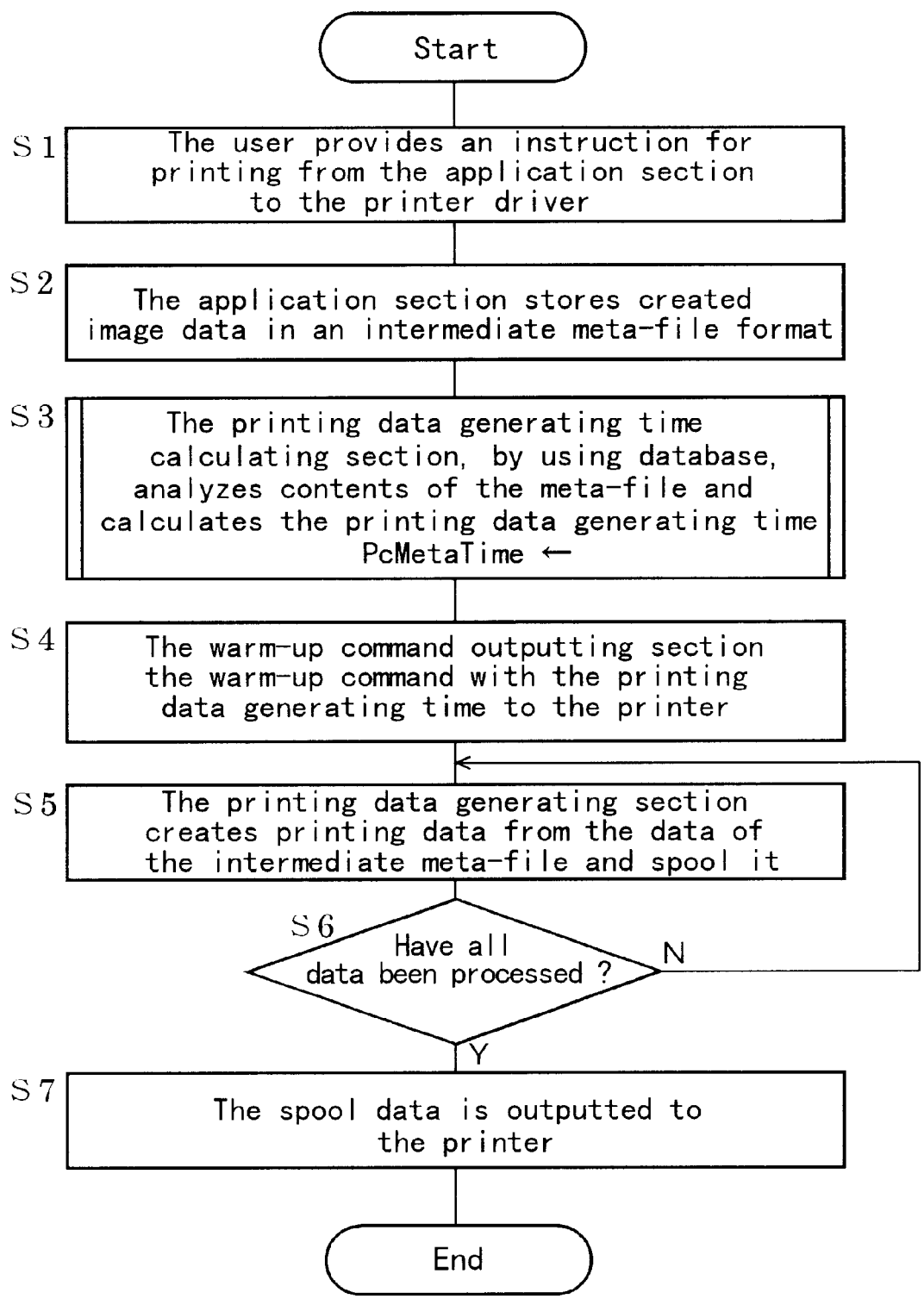
FIG. 16 is a flowchart showing operations of the host computer according to the fourth embodiment.

FIG. 16 is a flowchart showing operation of the host computer according to the fourth embodiment.

In step S1 in FIG. 16, the user provides an instruction for printing to the printer driver 11 from the application section 6 of the host computer. The application section 6 stores created image data in an intermediate meta-file 5 format. Next, in step S3, the printing data generating time calculating section 13 analyzes contents of the intermediate meta-file by using the database 3. These procedures are the same as in the first embodiment.

In step S4, the warm-up command outputting section 15 sends printing data generating time obtained by the printing data generating time calculating section 13 after adding it to the warm-up command to the printer. Then, the printing data generating section 12 creates printing data from the intermediate meta-file and spool it. The subsequent procedures are the same as in the first embodiment.

Figure 17:
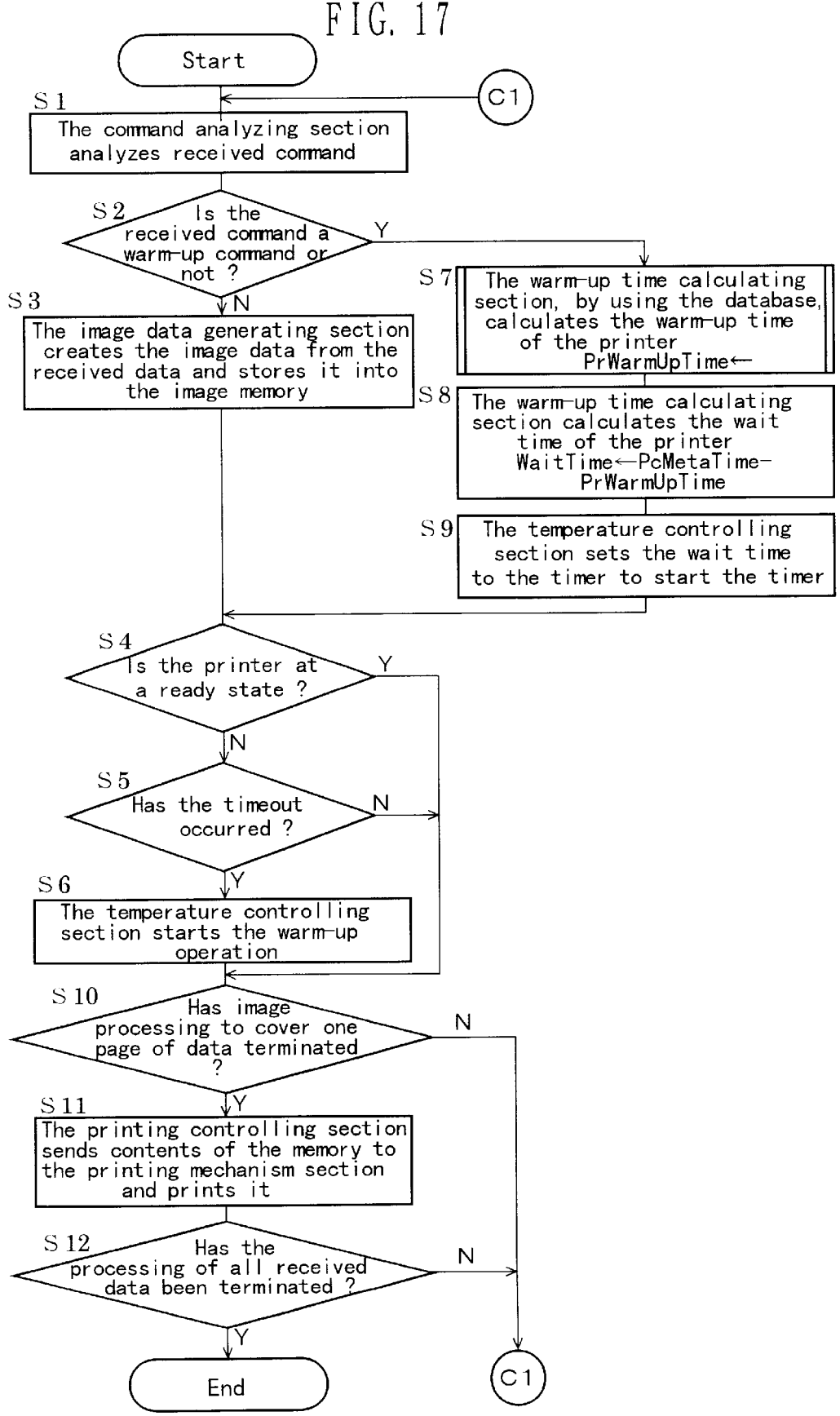
FIG. 17 is a flowchart showing operations of the printer according to the fourth embodiment.

FIG. 17 is a flowchart showing operation of the printer according to the fourth embodiment.

First, in step S1, the printer controlling section 20 analyzes received commands. In step S2, whether the received command is a warm-up command or not is judged. If it is the warm-up command, a processing peculiar to this fourth embodiment is carried out.

The operation goes from step S2 to S7. The warm-up time calculating section 28 calculates the warm-up time of the printer using the database 24. In step S8, the warm-up time calculating section 28 calculates wait time of the printer. The wait time is obtained by deducting the warm-up time of the printer from the printing data generating time. Furthermore, the operation goes to step 9, and the temperature controlling section 25 sets the wait time to the timer 29 to start it.

The subsequent processing is the same as in the second embodiment. The timer 29 is started and, in step S5 and S6, the timer is monitored. This causes the timer to count the wait time and then the warming-up operation is started.

According to the fourth embodiment, the printer controlling section is provided with functions to calculate the warm-up time, thus taking off the load imposed on the printer driver 11 of the host computer. Other effects are the same as in the first, second and third embodiments.

Fifth Embodiment

In the previous embodiments, the warm-up time of the printer is uniformly calculated in accordance with types of printing paper of the printer. However, immediately after the termination of printing operation of the printer, because the temperature of the fixing mechanism section 31 is considerably high, the warm-up time is short. On the other hand, when the printer remains unused for a long time and the fixing mechanism section 31 is at a room temperature, the warm-up time is as designated. These conditions are taken into consideration in the following embodiments. By doing this, the timing for generation of the printing data and for termination of the warming-up is further optimized.

Figure 18:
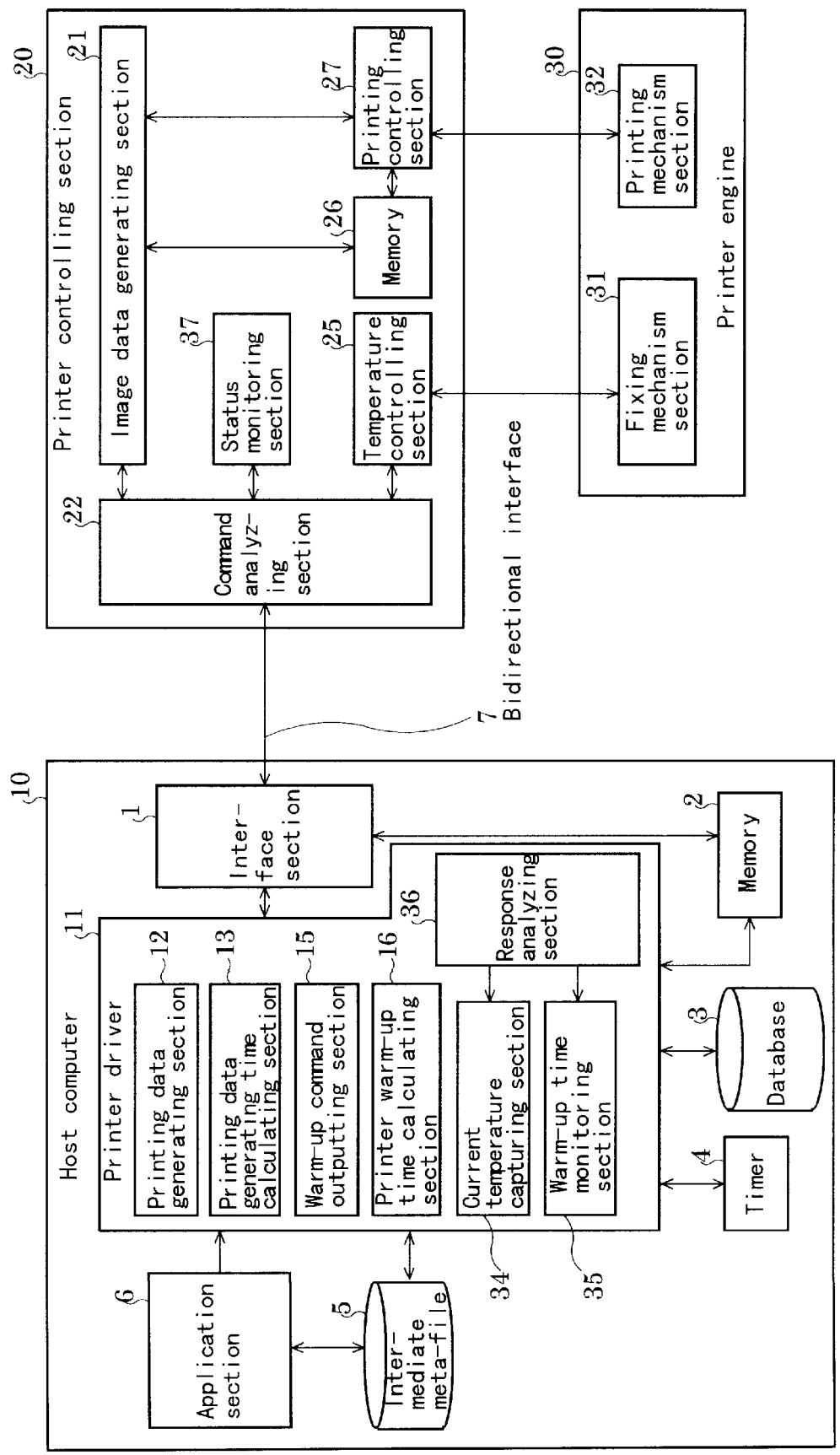
FIG. 18 is a block diagram showing a printing system according to the fifth embodiment.

FIG. 18 is a block diagram showing a printing system according to the fifth embodiment. The configurations shown in FIG. 18 is comprised of components shown in FIG. 1 and a current temperature capturing section 34, a warm-up time monitoring section 35 and a response data analyzing section 36 added to the printer driver and a status monitoring section 37 added to the printer controlling section 20.

The status monitoring section 37 at the printer controlling section 20 has a function of getting information about the status of the printer including the initial state, warm-up state and ready state and of notifying it to the host computer 10. The current temperature capturing section 34 of the host computer is a section to require information about temperature of the fixing mechanism section 31 of the printer controlling section 20.

The warm-up time monitoring section 35 of the host computer 10 gets information about temperature at the fixing mechanism section from the temperature controlling section 25 of the printer controlling section 20 and registers it on the database 3. This causes new warm-up time data to be created and registered as a warm-up time managing table. Contents are described in detail.

The response data analyzing section 36 has a function of analyzing data transferred as a response to the host computer 10 from the printer controlling section 20 and of notifying necessary data to the current temperature capturing section 34 or the warm-up time monitoring section 35.

FIG. 19 is an explanatory diagram showing operation of the warm-up time calculating section.

FIG. 19(a) is a table showing relation between the warm-up start temperature ST-TEMP and the warm-up time. As shown in the table, for example, if the warming-up start temperature of the fixing mechanism section 31 is 35° C., its warm-up time is 30,000 milliseconds. If it is 50° C., its warming-up time is 25,000 milliseconds. FIGS. (b) to (e) show calculating formulas of specific warm-up time. These are used for explanation of the following flowchart.

FIG. 20 is a flowchart showing operations of the host computer according to the fifth embodiment.

The current temperature capturing section 34 outputs a current temperature read command and sends it to the printer controlling section 20 through the bidirectional interface 7. The temperature controlling section 25 gets the information about the temperature of the fixing mechanism section 31. When this is returned to the host computer 10, the response data analyzing section 36 sends the information about the temperature back to the warm-up time monitoring section 35. Thus, the present temperature of the fixing mechanism section 31 is read out.

Next, in step S5, the printer warm-up time calculating section 16 calculates the warm-up time. The details of it are described in the subsequent drawing. When the operation goes from step S5 to S6, the warm-up command outputting section 15 calculates the wait time in accordance with procedures described above and causes the timer 4 to start.

At this point, when the timer 4 is started, in step S7, whether a timeout occurs or not is monitored. If the timeout has not occurred, the operation goes from step S7 to S11 and the printing data generating section 12 continues the generating processing of the printing data from the intermediate meta-file. Whether all the data are processed or not is judged in step S12 and the processing in step S7 to S12 is repeated.

If the timeout has occurred, the operation goes from step S7 to S8. In step S8, the current temperature capturing section 34 again outputs the current temperature read command to read out the temperature information, i.e., the current temperature of the heater. In step S9, the warm-up command outputting section 15 outputs the warm-up command to the printer. Furthermore, in step S10, the warm-up command outputting section 15 drives the warm-up time monitoring section 35 to be operated.

Next, the calculation of the printer warm-up time in step S5 and the operation of the warm-up time monitoring section are in turn described using the flow-chart.

FIG. 21 is a flowchart showing operations for calculating the time required for the printer warming-up.

The warm-up time, as described in FIG. 21(a), can be calculated using the temperature of the fixing mechanism section at the time the warming-up starts. However, the actual time is not always provided in the warm-up time managing table in as shown in FIG. 19(a). Therefore, after reading out the data contained in the warm-up time managing table and by comparing the data with the current temperature and, if necessary, by interpolating the data by indirect insertion method and the warm-up is calculated.

In step S1 shown in FIG. 21, the read pointer of the warm-up time managing table is initialized. That is, a pointer is set to the initial data in the warm-up time managing table shown in FIG. 19(a). In step S2, the temperature information is read from this table. The initial temperature information, for example, the data with the factor number 0, is read out.

In step S3 shown in FIG. 21, whether the current temperature actually measured is lower than that read in the managing table is judged. While the actually measured temperature is being compared with the temperatures in the table, the processing shown in step S4 to S9 is repeated. Since the reading in the table is made from the data having lower initial temperature information, if the measured temperature is high, the operation goes back from step S5 to S2 to read the subsequent table.

Moreover, if the actually read temperature is lower than that shown in the table, in step S6, whether there is data showing the temperature being lower than that is judged. If it exists, the operation goes to step S8. If not exist, the operation goes to step S9. When the actually read temperature is the same as that in the table, the operation goes to step S10. Through such processing, the information about the temperature being closest is obtained from the table. If there is no exactly matched information about the temperature, the warm-up time is calculated by conversion using temperatures being higher and lower.

Specifically, the calculation shown in FIG. 19 (b) is performed as the processing in step S7. Also, the calculation shown in FIG. 19(c) is performed as the processing in step S8. The calculation shown in FIG. 1(d) is performed as the processing in step S9. If there is a snugly matched temperature in the table, the data given in the table can be applied and therefore the calculation shown in FIG. 19 (e) is carried out as the processing in step 10.

Thus, the warm-up temperature in the case where the actually measured temperature is exactly the warming-up start temperature is calculated.

Figure 22:
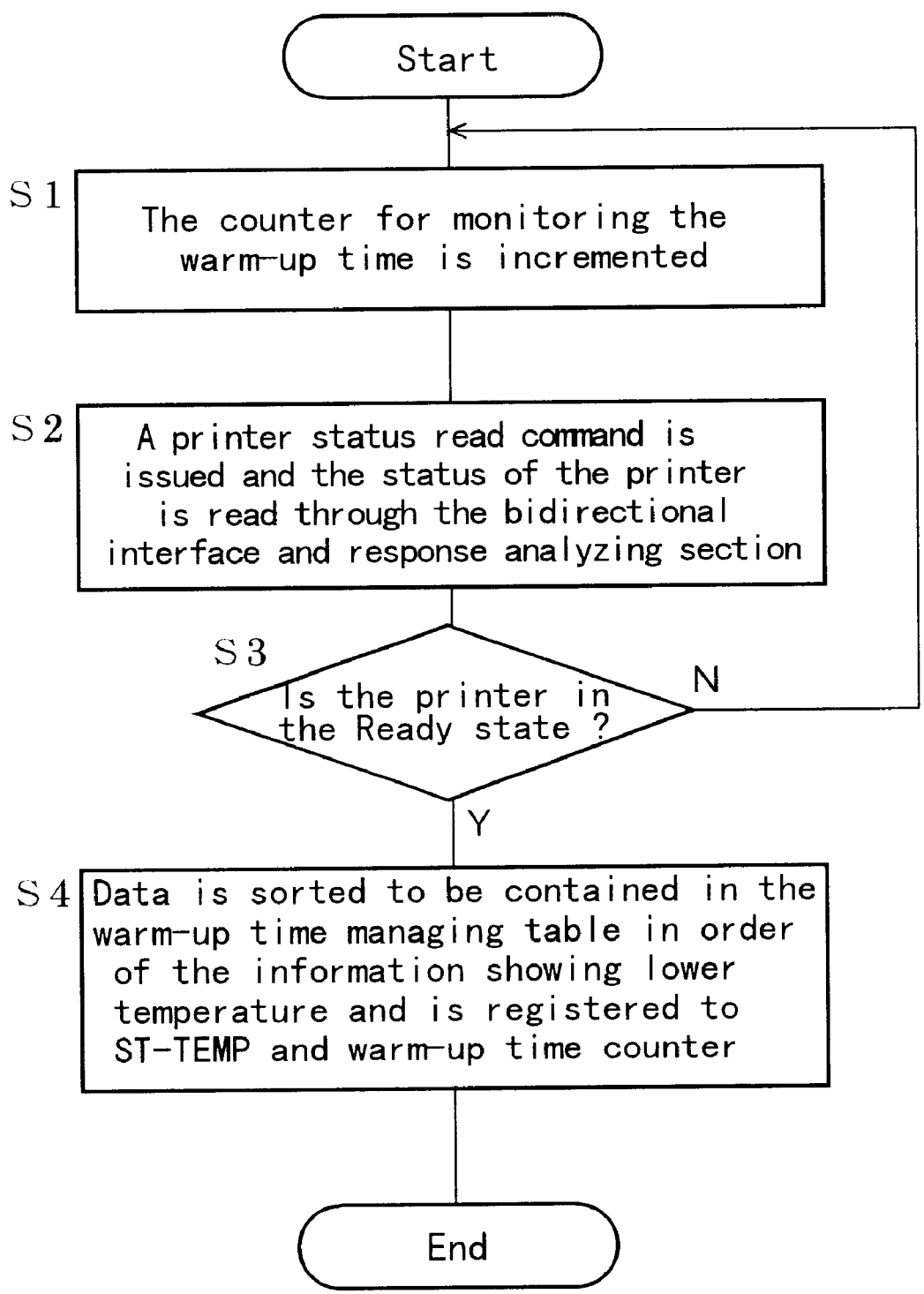
FIG. 22 is a flowchart showing operations for monitoring the warm-up time.

FIG. 22 is a flowchart showing operations for monitoring the warm-up time.

In step S1 in FIG. 22, when the warm-up time monitoring section 35 is driven, a counter (not shown) used for monitoring of the warm-up time is first incremented. Next, in step S2, the warm-up time monitoring section 35 issues a printer status read command to read the status of the printer. In step S3, whether the status of the printer is in the ready state, i.e., in the state where the warming-up is complete or not is judged. If the warming-up is not complete, the warm-up time monitoring section 35 periodically increments the counter for monitoring the warm-up time and monitors the status of the printer. When the printer is in the ready state, the operation goes to step S4 and the obtained data is sorted and registered to the warm-up time managing table in order of information showing lower temperature.

That is, the warm-up time monitoring section 35, after having gotten the information about the initial temperature of the warm-up time, measures actual warm-up time using the counter for monitoring the warm-up time. Then, when the warming-up is complete, the temperature at the time of starting of the warming-up is associated with the warm-up time, and the associated data is registered to the database 3 shown in FIG. 18. When the processing is repeated for every processing of the warming-up, contents of the database 3 are automatically reinforced and in turn accumulated. Therefore, the warm-up time can be more exactly calculated.

Figure 23:
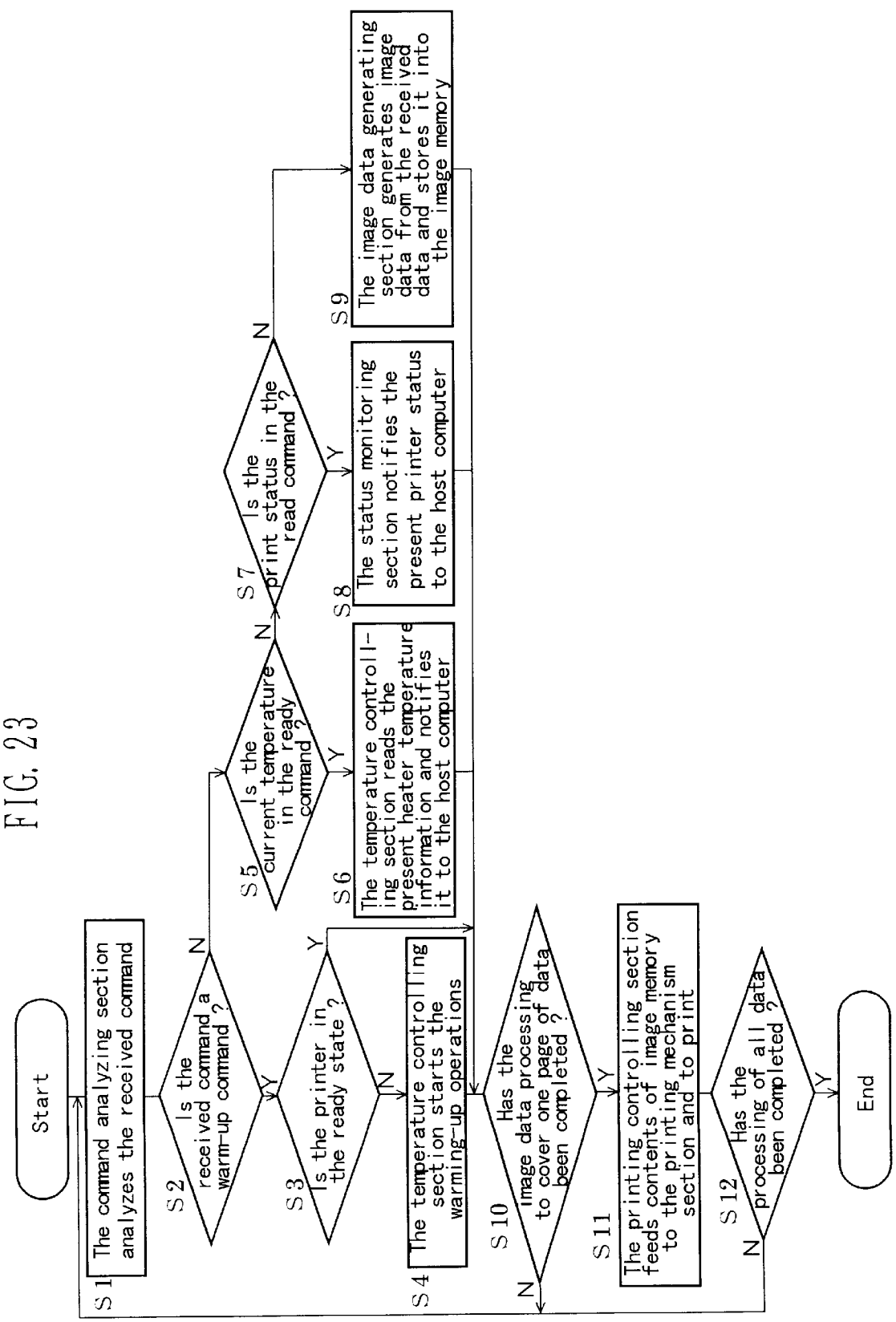
FIG. 23 is a flowchart showing operations of the printer according to the fifth embodiment.

FIG. 23 is a flowchart showing operations of the printer according to the fifth embodiment.

When the command analyzing section 22 of the printer controlling section 20 shown in FIG. 18 receives a warm-up command from the host computer 10, the operation goes to S3 through steps S1 and S3. In step S3, whether the warming-up of the printer is complete or not is judged. If the warming-up is not complete, the operation goes to step S4 and the temperature controlling section 25 is driven to start the warming-up operation. If the command is not the warm-up command, whether it is a current temperature read command or a printer status read command is judged.

Before the warm-up command is outputted by the host computer 10, a current temperature is read out. At this time, the current temperature read command is inputted and the operation goes to step S6 from step S5. The temperature controlling section 25 reads a heater temperature information of the fixing mechanism section 31 and notifies it to the host computer 10.

As described in FIG. 22, if the warm-up time monitoring section 35 gets the relation between the actual warm-up time and the time of starting of the warming-up and registers it to the database 3, the printer status read command is inputted. At this time, in the printer controlling section 20, the operation goes from step S7 to S8 and the status monitoring section 37 is driven to notify the current printer status to a host.

When the warming-up is terminated and the printing data is received from the host computer 10, the image data generating section 21 is operated and the image data is transferred to the memory 26 in step S9. In step S10, S11 and S12, the printing operations are the same as described previously.

The names and functions of the current temperature capturing section 34, warm-up time monitoring section 35 and response data analyzing section 36 mounted on the above host computer may be changed as necessary, i.e., these sections may be configured in any manner if only so configured that the temperature information obtained at the time of starting of the warming-up is required of the fixing mechanism section 31.

The method by which the table is stored, renewed or registered on the database 3 in accordance with actual results of warming-up is really practical, however, if contents of the table are defined in advance, they may be fixed. Since an error is allowable to some extent, they may be so configured that the warm-up time corresponding to the closest initial temperature can be captured by referring to the table.

Thus, by providing the current temperature capturing section to the host computer and by getting temperature information of the printer, the warm-up time can be easily calculated. Other effects are the same as in the embodiments described above.

Sixth Embodiment

Figure 24:
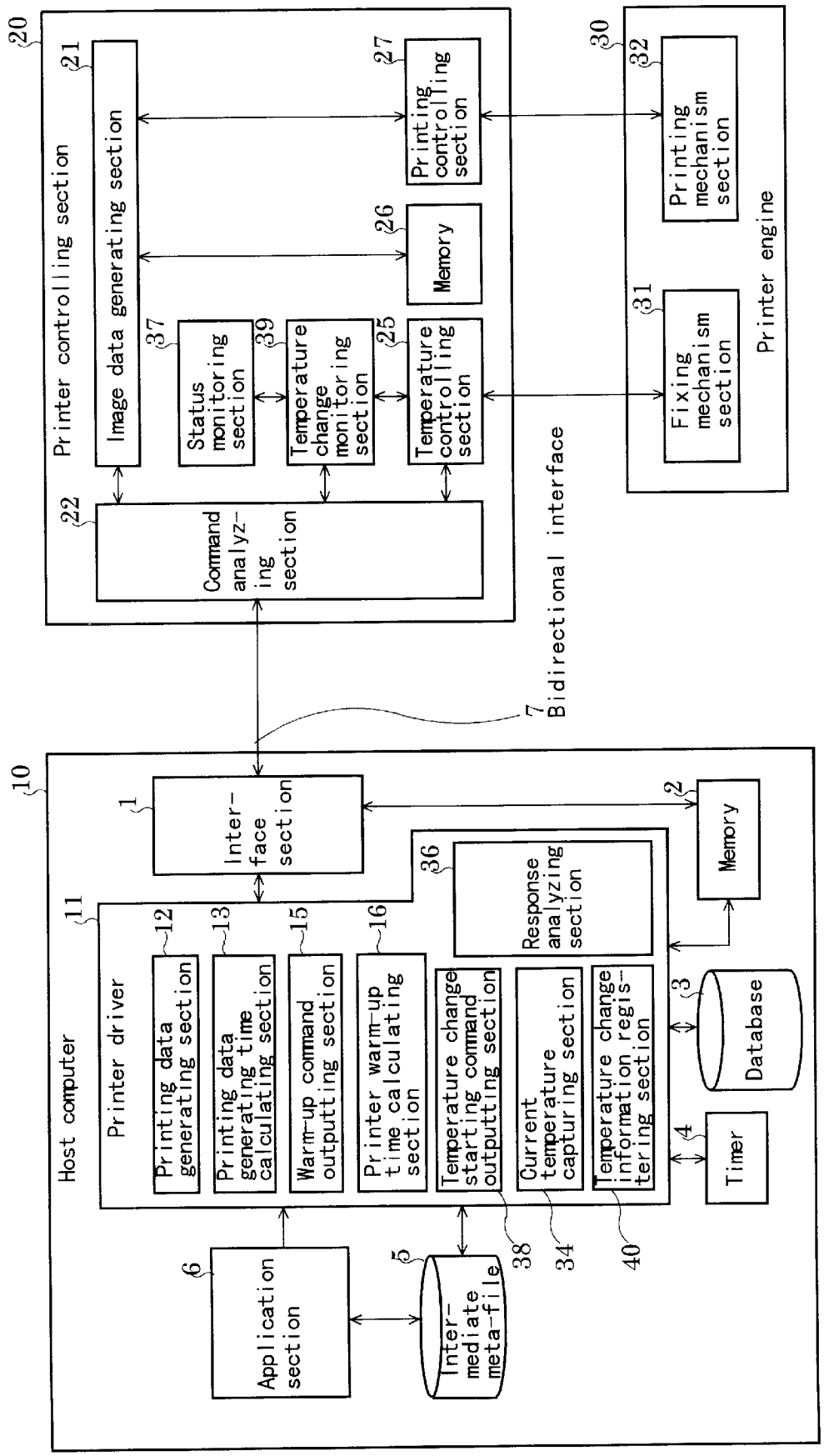
FIG. 24 is a block diagram showing the printing system of a sixth embodiment.

FIG. 24 is a block diagram showing the printing system of a sixth embodiment.

In this example, the printing system is comprised of the same components as those shown in FIG. 18 of the fifth embodiment and of a temperature change monitoring command outputting section 38 and a temperature change information registering section 40. The temperature change monitoring section 39 is added to the printer controlling section 20.

In this embodiment, the temperature change monitoring section 39 mounted on the printer controlling section gets changes in the temperature as data and notifies it to the host computer. By this, specific detailed characteristics of warming-up are obtained, enabling optimization of the warm-up time.

Figure 25:
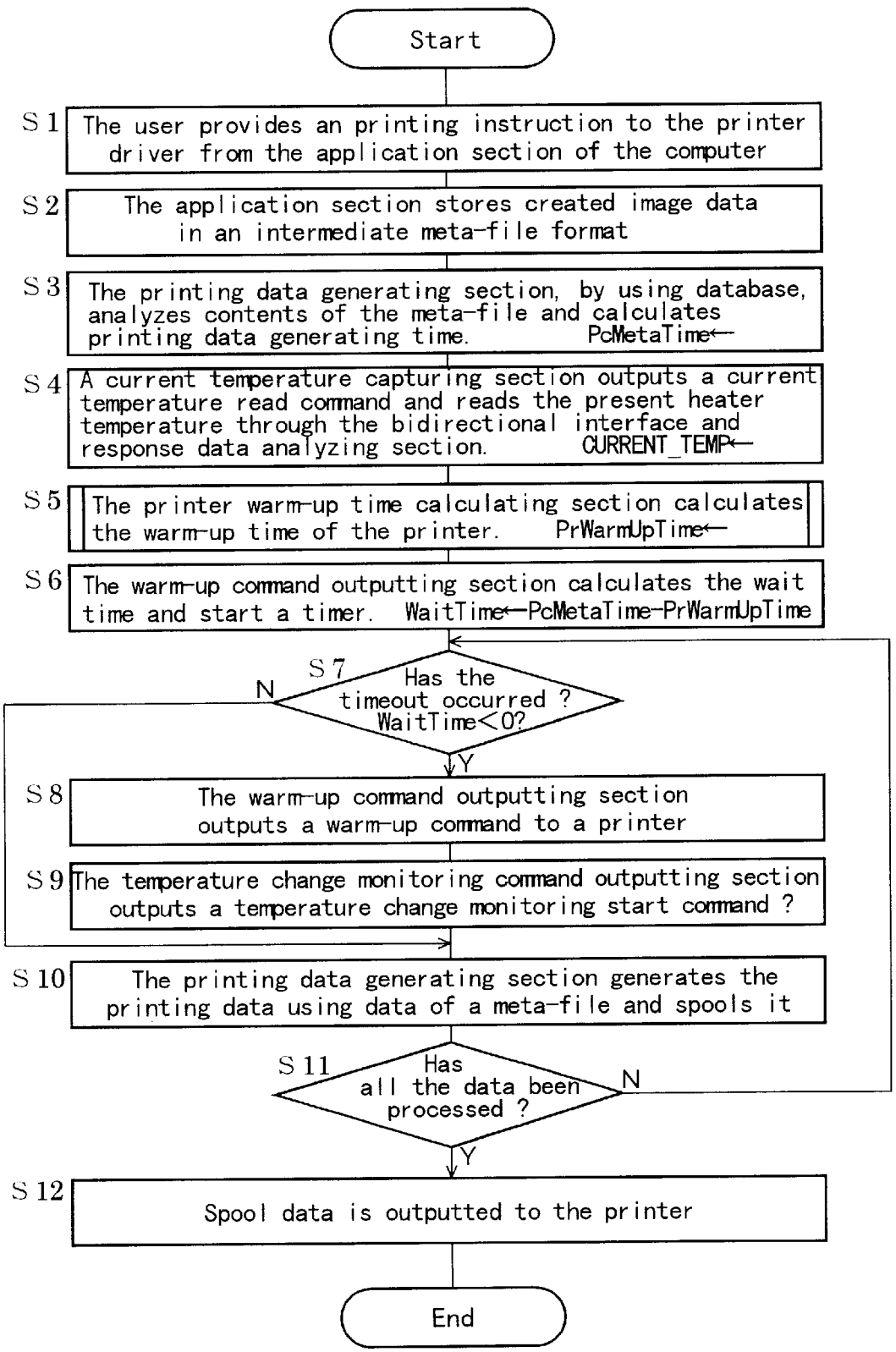
FIG. 25 is a flowchart showing operations of the host computer according to the sixth embodiment.

FIG. 25 is a flowchart showing operations of the host computer according to the sixth embodiment.

Most of the procedures are the same as those in the fifth embodiment. Only the processing in steps S8 and S9 is different. In step S8, the warm-up command outputting section 15 outputs a warm-up command to the printer. In step S9, a temperature change monitoring command outputting section 38 adds a temperature change monitoring start command to a warm-up command to output them. This causes the printer controlling section 20 to start monitoring of the temperature change.

Parameters are added to this command with which the amount of changes of temperatures at which a temperature information is returned is specified.

Figure 26:
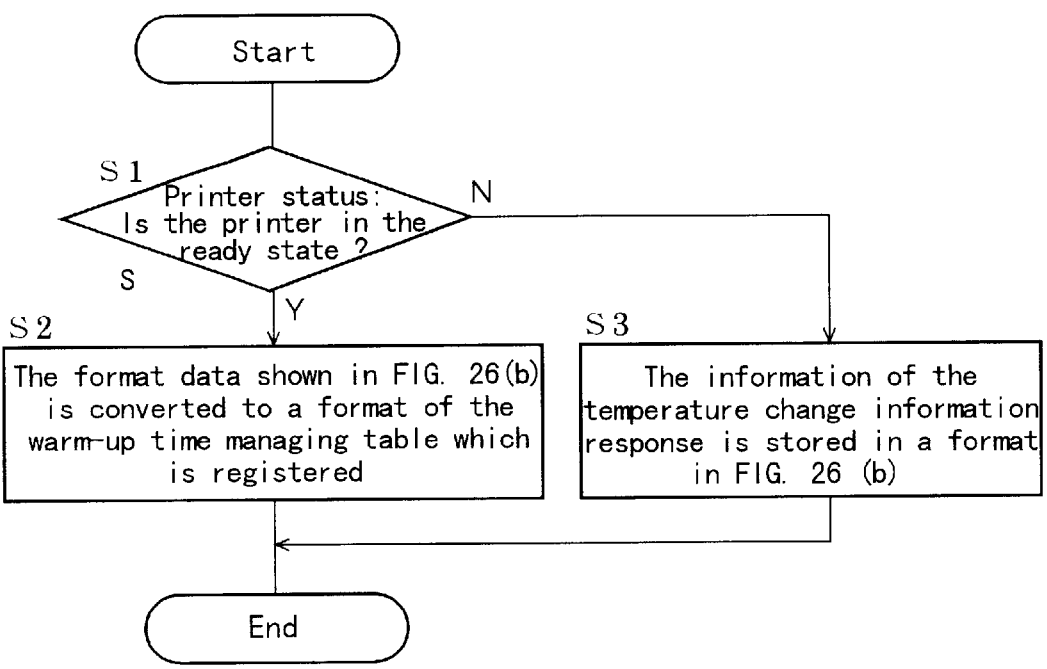
FIG. 26 is a flowchart showing operations of the printer according to the sixth embodiment.

FIG. 26 is a flowchart for registration to the warm-up time managing table.

When the temperature change is made by the printer and when the result is notified to the host computer, the temperature change information registration section 40 of the host computer registers a management table to the database 3 in accordance with the processing shown in FIG. 26(a). The contents of the management table are the same as those in FIG. 19 of the fifth embodiment.

In step S1 in FIG. 26, the temperature change information registering section 40 makes an inquiry about the printer. After the warming-up is complete, if the printer is in the ready state, the operation goes to step S2. The temperature change information registering section 40 converts a format data in FIG. 26(b) into a format of the warm-up time management table and registers it. On the other hand, if the printer is not in the ready state, in step S3, the information contained in the response of the temperature change information is stored in a format in FIG. 26 (b).

FIG. 26(b) shows contents of data of the management table obtained by the temperature change monitoring section 39 in FIG. 24. Here, the temperature change monitoring section 39 registers its temperature associated with the remaining time to the warming-up every time the temperature of the fixing mechanism section 31 is raised by 5° C. The STS INFO shown in the rightmost in FIG. 26(b) shows the state of the printer. If this information is "1", the printer is during warming-up while this information is "0", it shows that the warming-up is complete.

Figure 27:
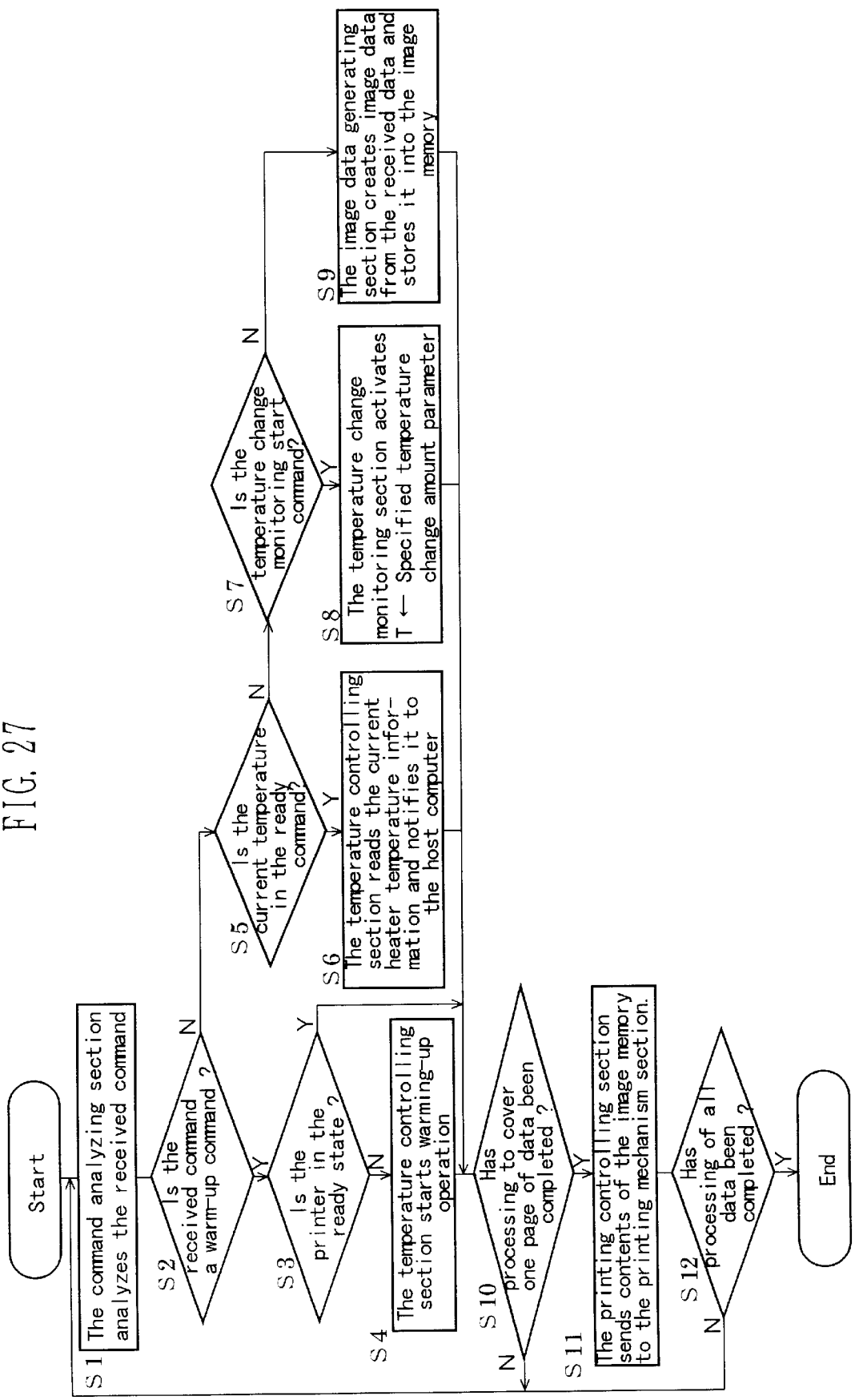
FIG. 27 is a flowchart showing operations of the printer according to the sixth embodiment.

FIG. 27 is a flowchart showing operations of the printer according to the sixth embodiment;

The steps S7 and S8 in FIG. 27 differ from those in the fifth embodiment. In step S7, whether the received command is a temperature change monitoring start command or not is judged. If it is a temperature change monitoring start command, the operation goes to step S8, and the temperature change monitoring section 39 starts operation.

Moreover, the temperature change parameter added to a command is stored in T.

Figure 28:
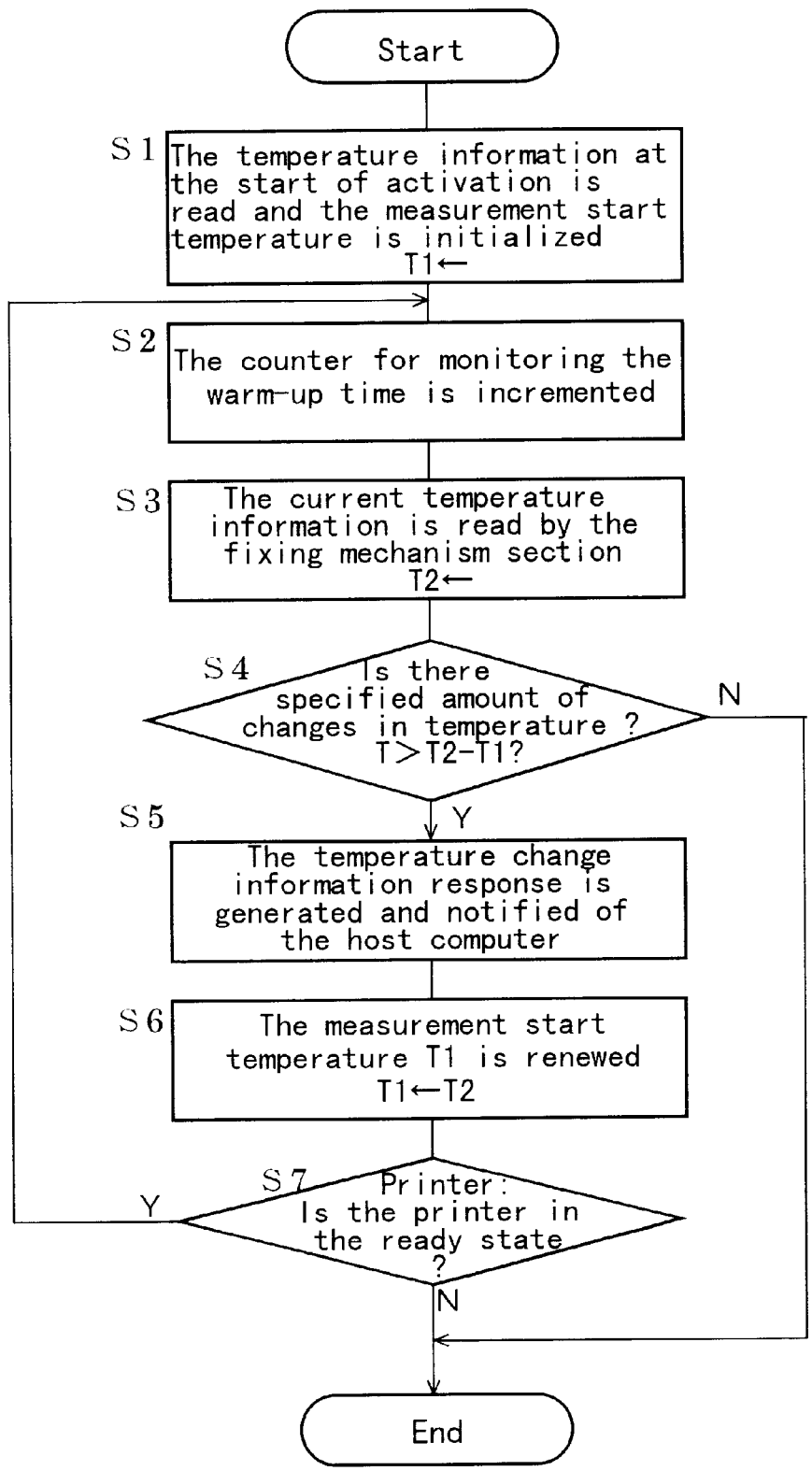
FIG. 28 is a flowchart showing operations of the temperature change monitoring section.

FIG. 28 is a flowchart showing operations of the temperature change monitoring section.

The temperature change monitoring section 39 performs the processing shown in FIG. 28. In step S1, the temperature information of the fixing mechanism section 31 is read out at the start of the operation and a measurement start temperature is initialized. The read temperature is a measurement start temperature. Next, in step S2, the counter for monitoring the warm-up time is incremented. This is a counter to calculate the warm-up time.

Next, in step S3, the current temperature information is read by the fixing mechanism section 31. This is performed by the temperature controlling section 25. In step S4, whether the specified amount of temperature change exists or not is judged. As in shown in FIG. 26(b), if data is obtained for every 5° C. of the temperature change, this T becomes 5. That is, if there is a change in temperature of 5° C.,contents of the host computer are notified. As shown in FIG. 26(b), its contents contain a temperature and a time being remained before the warming-up is achieved.

Next, in step S6, a measurement start temperature is renewed. That is, the temperature measured at present is obtained and held. In step S7, if the warming-up of the printer is judged not to be complete, the operation goes back to step S2 and the above processing is repeated. As shown in FIG. 26(b), contents of the management table are transferred in turn to the host computer and registered in the database.

Thus, according to this embodiment, since the host computer requires monitoring of temperature changes and the printer monitors in detail a change of the temperature after starting the warming-up and until the warming-up is terminated. Since the data is notified of the host computer, very exact warming-up time data is obtained. If the management table created by this is used, the warm-up time is exactly calculated, the generation of printing data and timing of warming-up are optimized as described in the previous embodiments.

In this embodiment, the printer is provided with functions of monitoring the temperature change and of calculating the warm-up time.

Figure 29:
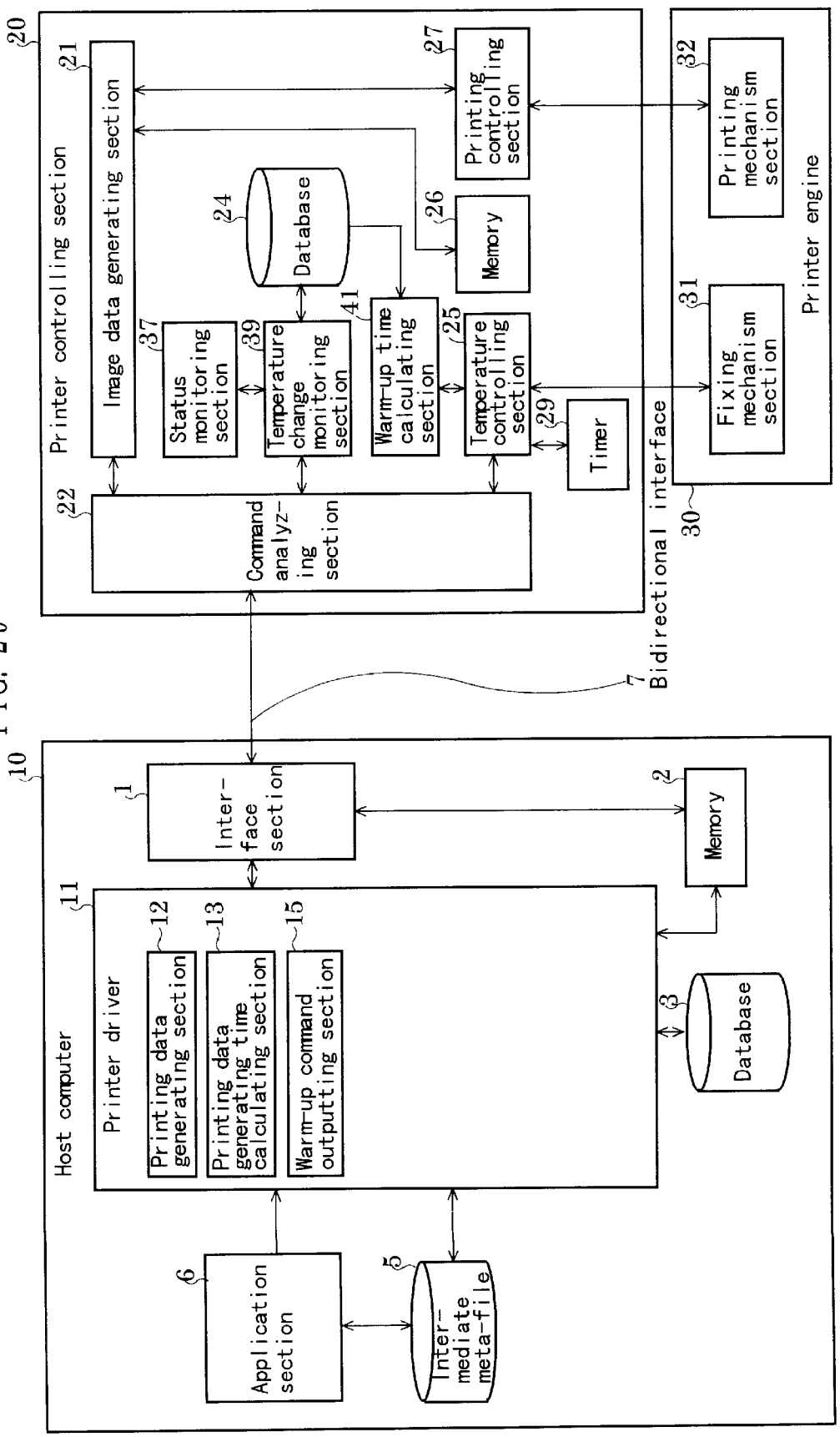
FIG. 29 is a block diagram of the printing system according to the seventh embodiment.

FIG. 29 is a block diagram of the printing system according to the seventh embodiment.

The host computer 10 is comprised of a printer driver 11, a printing data generating section 12, a printing data generating time calculating section 13 and a warm-up command outputting section 15. Moreover, the printer controlling section 20 consists of a status monitoring section 37, a temperature change monitoring section 39, a warm-up time calculating section 41 and a data base 24. Other components are the same as described above.

Moreover, the timer 29 of the printing controlling section 20 is used to adjust the timing of the termination of the printing data generating and of the warming-up. The status monitoring section 37 is a section to check the status of the printer and the temperature change monitoring section 39 is a section to check the status of the temperature change of the fixing mechanism section 31. The warm-up time calculating section 41 is a section where the printer calculates the warming-up time as described previously.

Figure 30:
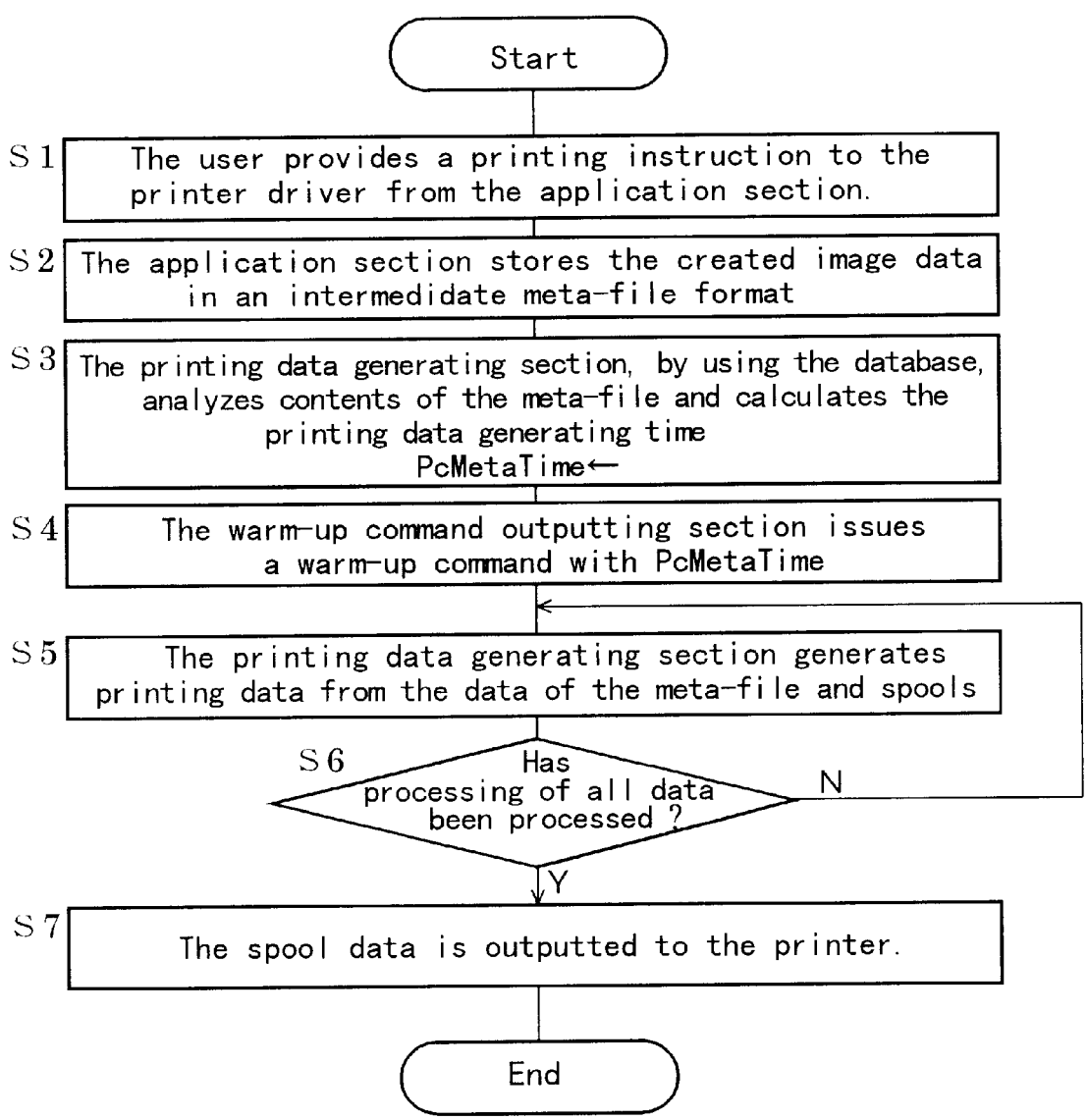
FIG. 30 is a flowchart showing operations of the host computer according to a seventh embodiment.

FIG. 30 is a flowchart showing operations of the host computer according to a seventh embodiment.

In this embodiment, because the host computer does not calculate the warm-up time, the processing is the most simplest. In step S1, when a printing instruction is provided to the printer driver 11 from the application section 6. In step S2, the application section 6 stores necessary data required for an intermediate meta-file. In step S3, the printing data generating time calculating section 13 calculates the time during which the printing data generating section 12 produces the printing data.

In step S4, the warm-up command outputting section 15 outputs a warm-up command to the printer. After that, as in the same manner, the printing data generating section 12 continues the generating processing of the printing data (step S5, S6 and S7).

Figure 31:
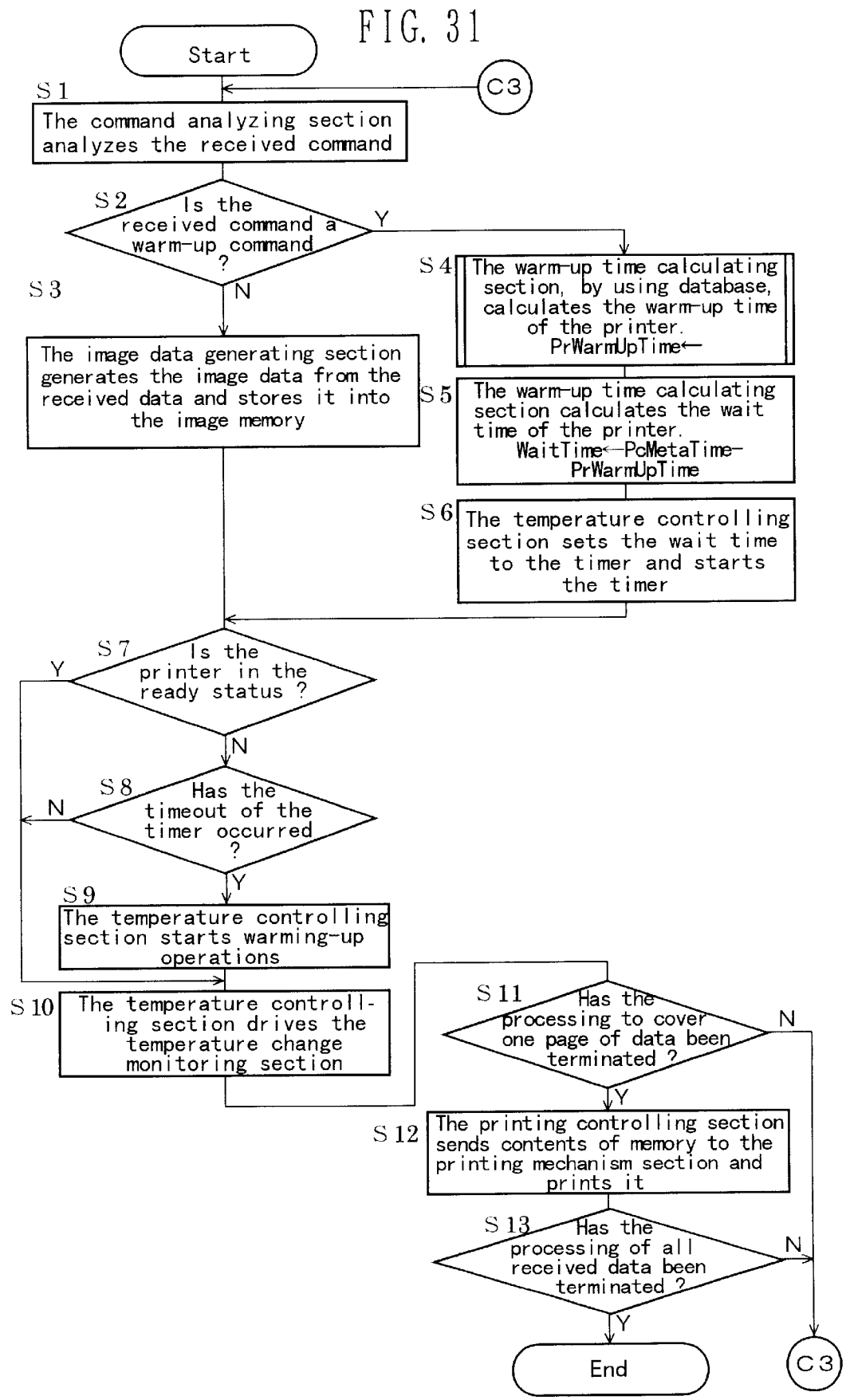
FIG. 31 is a flowchart showing operations of the printer according to a seventh embodiment.

FIG. 31 is a flowchart showing operations of the printer according to a seventh embodiment. In step S1, the command analyzing section 22 of the printer controlling section 20 analyzes the command received. Then, in step S2, whether the received command is a warm-up command is judged. If it is not a warm-up command, the operation goes to step S3 and the processing is started by the image data generating section 21. If it is a warm-up command, the operation goes to step S4. The warm-up time calculating section 41 calculates the warm-up time of the printer using the data base 4. In step S5, the printing data generating time obtained from the host computer and the wait time based on the warm-up time calculated by the warm-up time calculating section 41 are calculated. In step S6, the temperature controlling section 25 sets the wait time to the timer to have it started. The control is made so that the timing of terminating the generation of the printing data coincides with the timing of terminating the warm-up.

In step S7 in FIG. 31, if the warming-up of the printer is judged to be not terminated, the operation goes to step S8 and whether the timeout of the timer occurred is monitored. If the timeout of the timer occurs, the operation goes to S9, and the temperature controlling section 25 starts warming-up operation. In step S10, the temperature controlling section 25 drives the temperature change monitoring section 39.

That is, at the same time when the warming-up is started, the operation of the temperature change monitoring section 39 is started, and the temperature change at the fixing mechanism section 31 at the time of warming-up is monitored. The data required for calculating the warm-up time which is used later is obtained. The steps S11, S12 and S13, as described previously, are procedures for creating image data and for performing printing.

Figure 32:
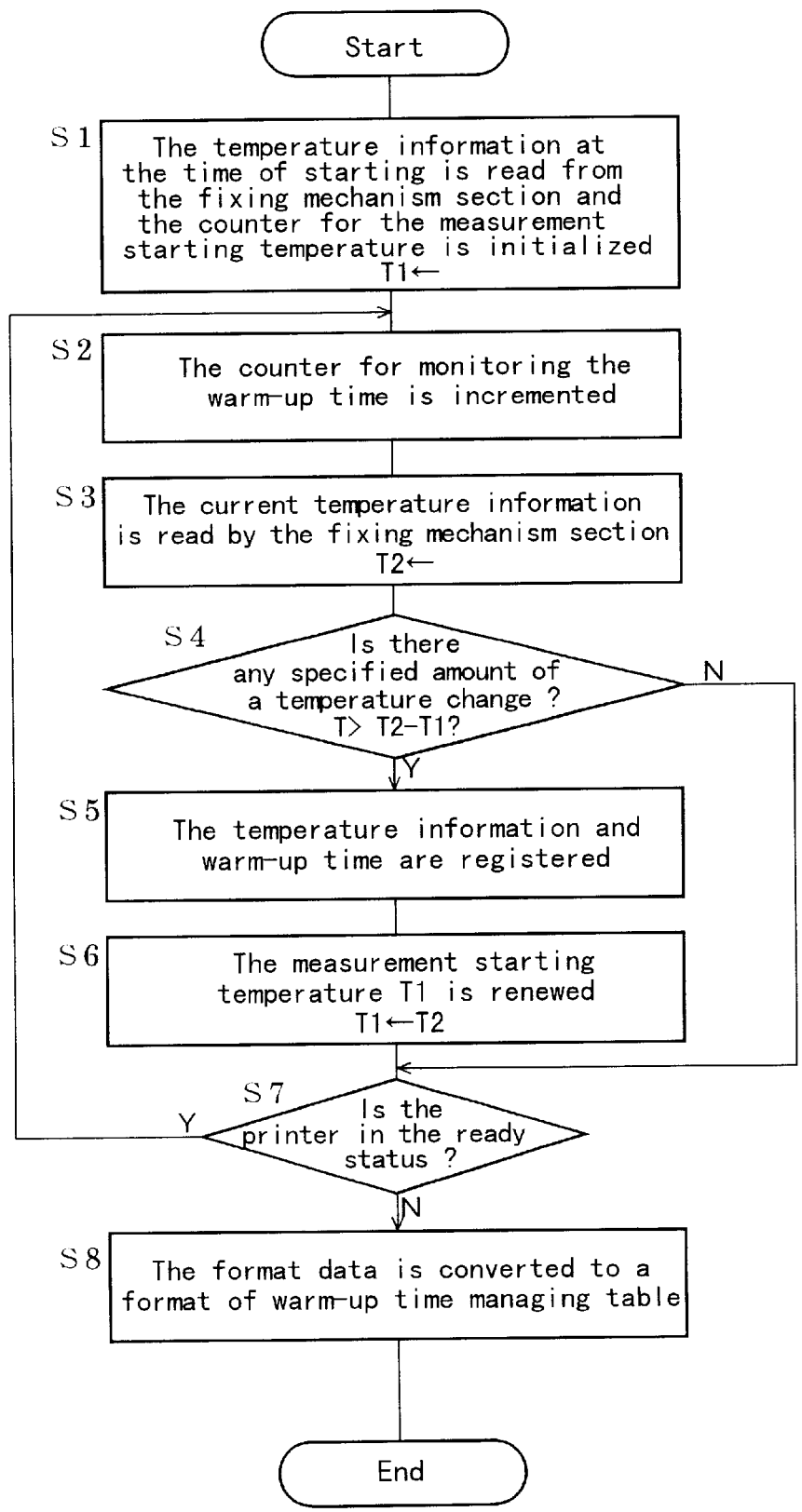
FIG. 32 shows a flowchart showing operations of the temperature change monitoring section.

FIG. 32 shows a flowchart showing operations of the temperature change monitoring section.

In step S1 in FIG. 32, the temperature information of the fixing mechanism section 31 at the time of starting is read and the measurement start temperature is initialized and set to this temperature. Next, in step S2, the counter for monitoring time of the warm-up is incremented. This counter is stored in the temperature change monitoring section 39.

Next, in step S3, the current temperature information is read from the fixing mechanism section 31. In step S4, whether there is a specified amount of temperature changes is judged. Let be assumed that the data is obtained at every 5° C. In step S5, the data as shown in the sixth embodiment of FIG. 26 (b) is obtained. The resulting content is registered in the printer. In step S6, the measurement start temperature is renewed.

In step S7, whether the printer has terminated the warming-up is judged. When the warming-up is terminated, the operation goes to step S8. After the table data is put in order, the database is constructed. By this, the table data is used for the subsequent calculation of the warm-up.

As described above, if the printer is provided with the temperature change monitoring section, the warm-up time calculating section and the database, etc., by outputting a warm-up command and printing data generating time to the printer, the printer automatically performs timing adjustment. The load of the host computer is alleviated accordingly. If the printer is provided with such functions, the host computer, without selecting the printer, can perform a certain uniform control.

In any embodiment, the power consumption can be reduced by incorporating the timing control. Moreover, by driving the fixing mechanism only if it is required, the life of a printer is increased. Furthermore, if the printer is provided with many functions, a complicated exchange between the host computer and the printer is not required, providing an effect of reducing the overhead.

On the other hand, there is a case where printing data is generated by the host computer before the warming-up of the printer is terminated. At this point, since the host computer has to wait for the transfer of printing data, the effective use of the memory resource is interfered. That is, since the host computer has to hold printing data for processing of calculation before the transfer of the printing data is terminated, the memory cannot be used for other operational processing.

It is apparent that the present invention is not limited to the above embodiments but may be changed and modified without departing from the scope and spirit of the invention.

What is claimed is:

1. A printing system comprising a host computer and a printer to perform printing by receiving printing data from the host computer;

said host computer having a printing data generating time calculating section for calculating the time required to generate said printing data, a printer warm-up time calculating section for calculating warm-up time of a printer and a warm-up command outputting section to send a warm-up command to said printer to start warming-up;

said warm-up command outputting section, by referring to calculating results of said printing data generating time calculating section and printer warm-up time calculating section, sends said warm-up command at the timing when the generation of said printing data is terminated at the same time or before said warming-up is terminated.

2. A printing system comprising a host computer and a printer to perform printing after receiving printing data from said host computer, said host computer having a printing data generating time calculating section for calculating the time required for generating said printing data, a printer warm-up time calculating section for calculating warm-up time of said printer and a warm-up command outputting section to send a warm-up command to a printer to start warming-up;

said warm-up command outputting section, by referring to calculation results of said printing data generating time calculating section and a printer warm-up time calculating section, sends data showing idle time to make starting of said warming-up delayed to said printer, together with a warm-up command, so that the generation of said printing data is terminated at the same time or before the warming-up is terminated.

3. The printing system according to claim 1 wherein the host computer is provided with a printer database capturing section to get data from said database of said printer for calculating the warm-up time of the printer.

4. A printing system comprising a host computer and a printer performing printing after receiving printing data from said host computer;

said host computer having a printing data generation time calculating section for calculating time to generate said printing data and a warm-up command outputting section for sending a warm-up command to said printer for starting warming-up;

said warm-up command outputting section sends the time for producing said printing data calculated by said printing data generation time calculating section to said printer together with said warm-up command, said printer is provided with a warm-up time calculating section for calculating warm-up time and a timer to control the starting timing of the warm-up so that warming-up is terminated at the same time or before the generation of printing data is terminated.

5. The printing system according to claim 4 wherein the timer controls the time from receiving a warm-up command from said host computer to starting warming-up.

6. The printing system according to claim 1 wherein said host computer is provided with a current temperature capturing section to get temperature information of said printer and wherein a printer warm-up time calculating section calculates warm-up time by using temperature information taken by a current temperature capturing section.

7. The printing system according to claim 6 wherein said printer is provided with a temperature change monitoring section to monitor a temperature change from the start of warming-up and wherein said host computer is provided with a temperature change information registering section which gets temperature change information from said temperature change monitoring section and registers, and wherein said printer warm-up time calculating section calculates warm-up time by using temperature change information registered to this temperature change information registering section.

8. The printing system according to claim 4 wherein said printer is provided with a temperature change monitoring section for monitoring a temperature change from the start of warming-up and wherein said warm-up time calculating section calculates warm-up time by using temperature change information registered to the temperature change information registering section.

* * * * *